United States Patent
Stuart et al.

(10) Patent No.: US 6,661,431 B1
(45) Date of Patent: Dec. 9, 2003

(54) METHOD OF REPRESENTING HIGH-DIMENSIONAL INFORMATION

(75) Inventors: Vincent Stuart, Cardiff, CA (US); Robert Allen Hahn, San Diego, CA (US); Bradley Steele Paye, San Diego, CA (US); Karen Christiana Joiner-Congleton, San Diego, CA (US); Andrew John Caffrey, San Diego, CA (US); Ryan Duane Persichilli, San Diego, CA (US)

(73) Assignee: Stone Analytica, Inc., San Diego, CA (US)

( * ) Notice: Subject to any disclaimer, the term of this patent is extended or adjusted under 35 U.S.C. 154(b) by 468 days.

(21) Appl. No.: 09/686,359

(22) Filed: Oct. 10, 2000

(51) Int. Cl.[7] ................................................ G06T 15/00
(52) U.S. Cl. ....................................................... 345/733
(58) Field of Search ................... 345/419, 473, 345/474, 475, 733, 734, 735, 736, 737; 707/102, 104.1, 202, 204

(56) References Cited

U.S. PATENT DOCUMENTS

| | | | | |
|---|---|---|---|---|
| 6,311,194 B1 | * | 10/2001 | Sheth et al. ................. | 715/505 |
| 6,466,940 B1 | * | 10/2002 | Mills .......................... | 707/102 |
| 6,480,885 B1 | * | 11/2002 | Olivier ....................... | 709/207 |

* cited by examiner

Primary Examiner—Phu K. Nguyen
(74) Attorney, Agent, or Firm—Morrison & Foerster LLP

(57) ABSTRACT

A method of representing high-dimensional information collects, organizes, and presents information on how a target interacts with objects. As the target, such as an individual or group, moves between the objects, the method collects navigation data indicative of the target's path. Relationships are identified in the navigation data, with the relationship data being aggregated to articulate a behavior. Once the behavior has been identified, an indicia indicative of the behavior is selected. A representation of selected objects is arranged on a display, and the indicia is mapped to the arranged objects. In such a manner, the high-dimensional behavior aspect of the navigation data is efficiently and concisely presented in relation to the objects.

47 Claims, 21 Drawing Sheets

METHOD OF REPRESENTING HIGH-DIMENSIONAL INFORMATION

FIELD OF THE INVENTION

The present invention relates to methods and systems for representing data. More particularly, the present invention relates to an improved method and system for collecting information corresponding to a plurality of desired parameters, correlating and interpretation the information in accordance with specified criteria and, thereafter, graphically presenting the information in a specified format.

BACKGROUND OF THE INVENTION

In today's fast-paced, dynamic and high-tech business environment, it has become more important than ever to understand the multitude of factors that may effect the performance, operation and/or profitability of a business. Such factors may include, for example, industry trends, consumer habits and behavior, the variance in behavior (e.g, purchasing behavior) between different consumer groups or geographic regions, the effectiveness of a particular marketing tool, and the efficiency of a particular system, subsystem or process, just to name a few. The better a business understands these factors, the more effective it will be in implementing change to optimize its operations and meet consumer demands, expectations and desires. Of course, the ability to understand and document the effectiveness of a particular change (e.g., a price change) is also important for a company to implement the correct changes.

Although the discussion below focuses on Internet businesses and technologies, it is understood that such discussion is exemplary only. Many other types of businesses and technologies such as the shipping industry or telecommunications industry, for example, face similar challenges in understanding the multitude of factors that effect their operation, efficiency and profitability. Thus the discussion provided herein is not intended to limit the field of the invention to only the Internet domain. However, for efficacy purposes, the present invention and some of the problems solved by the invention are described in the context of Internet businesses.

As one example of how technology has impacted the way companies do business, the Internet has revolutionized how businesses operate, perform transactions and provide information to their customers and to other businesses. For example, via the Internet, businesses can use electronic commerce technology to more quickly react to customer needs and perform sales transactions. The proliferation of electronic commerce has enabled businesses to not only attract customers and other businesses, but to engage in transactions with them irrespective of their geographic locations. Through the Internet, a small business can attract and interact with clients anywhere in the world. This same small business can also use the Internet to purchase its supplies or services from other businesses anywhere in the world. Thus, the Internet has enabled a global marketplace.

Unfortunately, the availability of information analysis tools has not kept pace with the proliferation of the Internet. For example, business managers are not able to fully understand how customers enter a web site, navigate the web site, and make a decision to purchase a product or service in the web site. Without this basic understanding, a business manager can only implement change with incomplete information, and typically is unable to efficiently gauge the effectiveness of the change. Further adding to the frustration, many systems and networks that are connected to the Internet are collecting huge quantities of raw data, but there is no facility or tool that easily and efficiently allows the business manager to correlate this vast amount of data and perceive important relationships in the raw data.

To establish a presence on the Internet, a business typically develops a web site for visitors to access. A web site operates on a server, with the server connected into the Internet system. The web site consists of individual pages, or web pages, which can be communicated to a visitor's computing device, where they are sequentially displayed. For example, when a visitor enters a web site, the web site communicates a "home" web page to the visitor. Accordingly, the visitor is presented a display offering general information, such as an index. The visitor then proceeds to navigate the web site by selecting hypertext links which cause the web site server to communicate other pages to the visitor. In such a manner, the visitor is able to navigate through a web site, receiving and viewing selected web pages in a sequential manner.

The web site may be constructed with predefined web pages, or web pages may be dynamically assembled with variable content by the web site server. For example, price and availability information may be extracted from a sales database and inserted into an assembled web page on an as-needed basis. A typical web site may have hundreds or even thousands of web pages which may be selected and viewed by a visitor. A primary goal of many of these web sites is to present the visitor with sufficient information and to entice the user to purchase a good or service. Accordingly, it is desirable that the visitor navigate through the web site in an efficient manner whereby the visitor can obtain information and be presented an opportunity to easily purchase a good or service. In a particularly popular paradigm, a visitor has an electronic "shopping cart" in which the visitor can place selected items for purchase. At the conclusion of the web shopping experience, ideally the visitor proceeds to an electronic "checkout" where the visitor authorizes payment and identifies delivery information. However, due to various reasons, a visitor may place items in a shopping cart and then exit the web site prior to consummating the purchase. Such abandoned shopping carts are of particular interest as these abandoned carts represent a strong consumer interest, although no sale was completed.

To assist the operator of a web site in understanding the effectiveness of the site, several tools currently exist to present basic data about how visitors interact with the web site. For example, tools presently exist that can present how often a particular web page is visited. A graphical representation in the form of a bar chart, for example, can illustrate how many times particular web pages were visited by users. By reviewing the bar chart, the web site operator can obtain a general understanding of the popularity of various web pages. Further, the tool may permit a web operator to view how a particular page was visited over a period of time. For example, the bar chart may indicate that a particular page is very busy early in the morning, but receives less business after normal work hours. Although such graphical information presents a particular view of one aspect of web site utilization, it is not well-suited to simultaneously and comprehensively represent the many dynamic properties of web site utilization information such as, for example, traffic volumes during a specified period of time, visitor demographics, how visitors navigate through the web site, duration of stay at each web page, visitor purchasing information, the correlation between visitor demographic and visitor navigation information, the correlation between visitor purchasing information and visitor navigation information, etc. As one can readily discern, the data contained in this type of information is diverse and voluminous. This type of information which may contain, for example, static and/or dynamic parameters, single or multi-variable parameters, vector data or cluster data (e.g., data representing relationships between objects or entities), as well as other types of data, is referred to herein as "high-dimensional information." For example, it is especially difficult to represent the characteristics of, and change in, paths and characteristics of paths traversed by visitors to a site, and how such traversals are affected by changes in web site design and promotion. Such "event-sequence" information is critical to analyzing web site effectiveness. Thus far, prior systems and methods have been unable to represent this type of high-dimensional information in a clear, concise and meaningful way.

The ineffectiveness of conventional systems is due in part to the vast amounts of raw data that must be interpreted to understand how visitors interact with a web site. With thousands of users, with varying demographics, originating from thousands of sites and navigating a site in almost infinitely varying sequences, the task of deriving any meaningful information is extremely cumbersome. Adding to the already complex data, a web site may be regularly changed, or may even be generating pages "on the fly." Accordingly, the enormous amounts of captured raw data cannot be adequately analyzed and understood with conventional systems. For example, the changes occurring in web sites and navigation patterns happen far too fast for conventional systems to provide meaningful change indicators. Instead, the known systems typically rely on simple two dimensional comparisons, such as bar charts, tables or flow charts, which are not well-suited for comprehensively and simultaneously representing the diverse and dynamic properties of high-dimensional information. Thus far, there has been no system or method which can consolidate and correlate the multitude of high-dimensional properties of, for example, web site utilization information, as described above, and present it in an easily understandable format.

The field of cognitive science reveals that humans are inherently weak at correlating large amounts of data to perceive high dimensional relationships between the data. Prior art methods and systems, which typically utilize static two-dimensional bar charts, tables or flow charts, do not provide a satisfactory solution to this dilemma. To obtain an understanding of high-dimensional information utilizing these prior art systems, users must view several different representations of the data, either simultaneously or sequentially, to correlate the information and discern a desired relationship. This process is tedious and time-consuming and an inefficient utilization of valuable human resources. Additionally, because humans may become overwhelmed by vast quantities of data, many high level relationships remain buried and undiscovered in the raw data. Consequently, these critical high level relationships have not been easily accessible by business managers as a tool for enhancing the effectiveness of their business.

For example, in one scenario, a web site operator wants to evaluate how effectively a web site attracts visitors, presents information to the visitors, and persuades the visitors to buy a product or service. In order to make this evaluation, the web site operator wants to know the following: What types of visitors are coming (e.g., demographics)?; How are the visitors navigating through the web site?; How long are they staying at each web page?; What is the content or subject matter that is attracting visitors?; Do particular types of visitors behave differently then other types of visitors?; What products or services are being purchased by which visitors?; How has a change in a particular web page impacted consumer behavior?; etc., etc. The correlation and conglomeration of data pertaining to each of these exemplary inquiries can provide the web site operator with a good understanding of consumer behavior and web site performance. However, prior methods and systems can only graphically represent data pertaining to a limited number of the queries above in a single graphical display. Thus, in order for a web site operator to obtain a comprehensive understanding of consumer behavior, the web site operator is required to view, simultaneously or sequentially, a multitude of graphical displays or presentations which illustrate the raw data corresponding to each inquiry. In other words, it is up to the web site operator to "make sense of it all." Therefore, there exists a need for an improved method and system of comprehensively conveying high-dimensional information, such as behavioral information, in a single graphical presentation that is easily understood.

SUMMARY OF THE INVENTION

It is therefore an object of the present invention to provide a presentation method and system for efficiently representing high-dimensional information. It is another aspect of the present invention that high-dimensional information be presentable on a single display or graphical presentation. These and other objects are accomplished by the method and system of representing high-dimensional information as disclosed herein.

In one embodiment, the method of representing high-dimensional information collects, organizes, and presents information on how a target interacts with objects. As the target, such as an individual or group, moves between the objects, the method collects navigation data indicative of the target's path. Relationships are identified in the navigation data, with the relationship data being aggregated to articulate a behavior. Once the behavior has been identified, an indicia indicative of the behavior is selected. As used herein the term indicia refers to any graphical symbol, object or structure and any attributes thereof such as size, color, shape, or other graphical characteristics, which represent one or more aspects or characteristics of an entity, relationship, or behavioral pattern. A more detailed description of specific examples of indicia is provided below in the detailed description of the invention. Next, a representation of selected objects is arranged on a display, and the indicia is mapped to the arranged objects. In such a manner, the high-dimensional behavior aspect of the navigation data is efficiently and concisely presented in relation to the objects.

In one embodiment, a display presents an arrangement of objects representing web pages and links for a web site. The method collects data regarding a visitor's navigation between web pages, and tracks how long the visitor remains on each page. A relationship between a visitor and a web page is developed, for example, when the visitor requests or views the web page. The duration that the visitor remains at the web page can be considered an attribute of the relationship. Relationship data is aggregated to determine specific behavior for the visitor. Preferably, the behavior can be related to an individual visitor, a group of visitors, a cluster of visitors, or a summary of all visitors. Depending on the behavior or behavior comparison being made, an indicia indicative of the behavior is selected and mapped onto the arrangement of web pages. For example, the indicia can be a symbol which represents the number of visitors that made an online purchase. By mapping this indicia on each web page visited by such visitors, a web site operator can discern which web pages are effective and which are not.

In another embodiment, the method for representing high-dimensional information efficiently and concisely provides complex high-dimensional information in a familiar and comfortable format. Accordingly, complex high-dimensional transaction behaviors are presented in a manner that can be readily perceived. Although the method is applicable to a wide range of transactions, the method is particularly useful for understanding how visitors behave in a web site. The web site operator, for example, is thereby enabled to quickly identify behaviors and trends, and make comparisons that facilitate understanding how visitors or aggregated visitors are navigating a web site. Armed with such information, the web site operator is enabled to make web modifications to more efficiently convert web site visitors into web site customers that actually purchase goods or services. In a similar manner, the web site operator can modify the web site to more efficiently direct visitors to visit key pages.

In a further embodiment, the invention provides a method and system for efficiently and conveniently displaying high dimensional information related to how effectively a web site is attracting visitors, presenting information to those visitors, and converting the visitors into customers. In particular, the method provides a powerful and flexible presentation of the behavior that a visitor or a group of visitors exhibit while navigating a web site. Using such visitor behavior, a web site or an advertising campaign may be modified to more effectively attract, educate, and sell to visitors.

In a further embodiment, the method uses a node link diagram of selected web pages as a template or background on a display. High dimensional information is calculated or derived from data collected on visitors' navigation of the web site. For example, data may be collected regarding which pages each visitor requests, and may track how long each visitor remains on each page. Using this navigational data, the method calculates high dimensional information such as group behavior or behavior trends. The method maps selected high dimensional information onto the web page template to illuminate visitor behavior. Also, the method enables sophisticated comparisons between the behavior of collections of visitors and comparisons of behavior in different time periods. In a particular embodiment, the method permits animation of the high dimensional data to illustrate behavior as a function of time.

In another embodiment, the method displays sophisticated high dimensional information in a format enabling a web site operator to efficiently understand how visitors behave and react to modifications or other events. Such a complete and powerful presentation method is not provided by any known conventional data presentation method.

Other features and advantages of the present invention will become apparent from the following description taken in conjunction with the accompanying drawings.

DETAILED DESCRIPTION OF THE INVENTION

A preferred embodiment of the present invention is described below with reference to the figures, wherein like elements are referenced with like numerals throughout. It should be understood, however, that the invention is not limited to this preferred embodiment but covers other embodiments and applications in various environments readily apparent to those of skill in the art. For example, many types of manufacturing processes and/or accounting, and economic transactions, which are typically profiled using low-dimensional information, may benefit from the efficient generation and presentation of high dimensional behavioral information. Accordingly, the present invention enables the perception of the complex, high-dimensional aspects of transactions, processes and behaviors in any industry, business or environment wherein the analysis of such high-dimensional information may be desired. For example, the method of the present invention may be used to monitor and present network data traffic magnitudes and trends. Other fields, such as common carrier routing and city planning may benefit from the invention.

Figure 1:
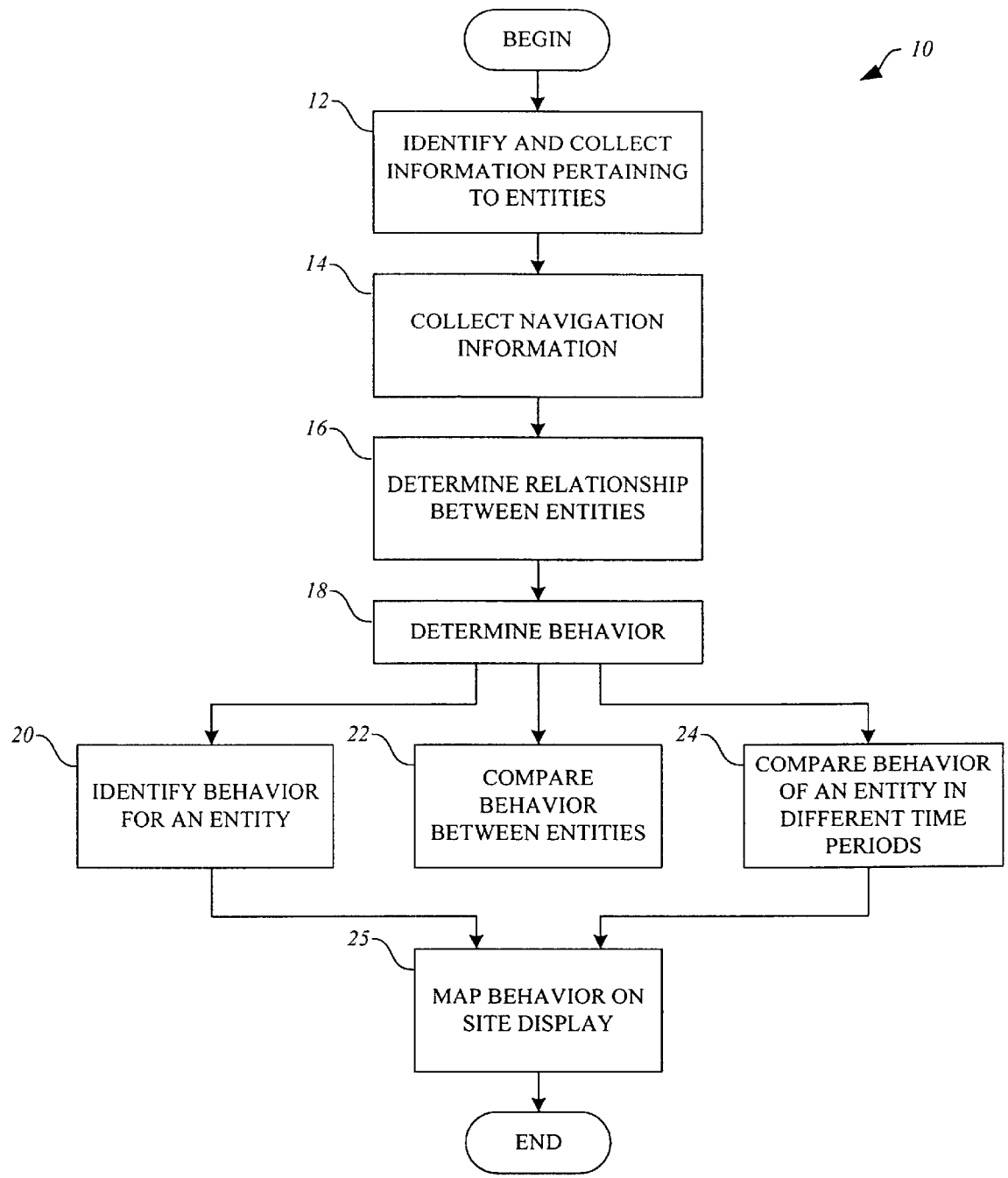
FIG. 1 is a flowchart of a method of representing high-dimensional information in accordance with one embodiment of the present invention.

Referring now to FIG. 1, a preferred method 10 of representing high-dimensional information pertaining to the behavior of users navigating in a web site is illustrated. Generally, the method 10 provides for the collection, analysis, and presentation of high-dimensional information in a comfortable and efficient format. Accordingly, the behavior of visitors, or a collection of visitors, can be presented and compared in a manner that facilitates better understanding of web site visitors, and, more importantly, provides tangible support for modifying and improving the web site. It will be appreciated that the method 10 may be used to collect, analyze, and present information regarding the activities of almost any actor.

To implement the method 10, at step 12, information pertaining to selected entities is collected. As described above, entities can be any object of interest such as a visitor to the web site. Additionally, individual web pages of the web site may also be defined as an entity. Methods of collecting data pertaining to users who visit a web site are well-known in the art. For example, a visitor's internet protocol, domain or URL address may be identified by known techniques. Information of a visitor's online purchasing history, for example, may be obtained, or demographic information which the visitor has previously disclosed in association with his or her internet address may also be accessed by means of well-known techniques in the art. Similarly, information pertaining to web pages may also be gleaned by well-known techniques. Web-page information may be a simple identifier which allows a web site operator to identify and differentiate between web pages within his or her web site. Or, in another embodiment, sophisticated text mining tools may be utilized to obtain high-level content information pertaining to each web page. Such text mining techniques are also well-known in the art.

After information pertaining to select entities of interest is collected, next, in step 14, using known techniques, web site navigation information is collected. Web site navigation data includes data on each visitor's access to each web page. In such a manner, the web site data tracks the path that every visitor takes in entering, traversing, and leaving the web site. In the preferred embodiment, visitors and web pages are the basic entities of the web site which are monitored and tracked. It will be appreciated that many different types of entities can be defined and tracked according to application specific needs. For example, it may be desirable that shopping carts be defined as entities and appropriate data collected for each.

Next, in step 16, relationships are defined between entities. As used herein, the term "relationship" refers to structures, patterns, acts or occurrences that relate entities to one another. For example, when a visitor requests or accesses a web page, a relationship is formed between the visitor and the web page. Another, more specific relationship may be defined, for example, when the visitor purchases a product advertised on the web page. Any interaction between a web page and an individual visitor may be defined as a particular type of relationship of interest. Other relationships may be defined according to a specific time or time period. For example, a relationship may be defined between a particular visitor and time spent on the web site. These relationships are predefined and developed as data is collected in step 16. It will be appreciated, however, that other relationships may be later defined and generated from stored site navigation data. The collected data from step 16 may be stored in a relational memory database (not shown) for later processing or presentation in a desired graphical display format.

Both relationships and entities can have attributes, which more specifically define the relationship or entity. For example, the top level domain name associated with a visitor is an attribute that permits the filtering of visitors to examine the behavior of visitors from one or more specific domain types. As to relationships, an example of an attribute is the time a visitor spends on a particular web page. Thereby, the attribute measures the duration of the relationship that a visitor has with a web page. It will be appreciated that many types of attributes can be defined for entities and relationships, and these attributes can be used to filter and identify particular collections of visitors.

With the relationships determined, in step 18, the relationship information is aggregated to articulate a particular behavior. For example, the behavior of an individual visitor can be represented as a sequence of web pages accessed by the visitor, or the behavior may represent a summary behavior of many visitors. For example, it may be interesting to observe how a group defined as "females" navigates a web site as opposed to a group defined as "males." The aggregation of a particular set of selected relationship information may be saved as a "behavioral file" in a relational memory database for later processing and/or presentation in a desired graphical display format.

With behavior determined, the behavior may be presented in a variety of formats. For example, behavior can be presented for an individual target in step 20. As used herein, the term "target" refers to any entity, such as a visitor, group of visitors, web page, or other object of interest, that is the focus of a particular inquiry. In representing an individual visitor's behavior, for example, the traverse behavior of an individual visitor may be displayed. Exemplary formats for displaying traverse behaviors are illustrated and described in further detail below with reference to FIGS. 6–13. At other times, it may be desirable to compare behavior between different targets, as in step 22. For example, the behavior of "males" may be contrasted to the behavior of "females" on a web site. By understanding the differences in how groups behave on a web site, the web site may be modified to better serve each of the groups. Also, behavior for a single target can be compared in different time periods as shown in step 24. For example, the visitors viewing a particular web page in the morning can be contrasted to the visitors visiting that same web page in the afternoon. Accordingly, the web site can be modified to adjust for changing patterns based on time. Additionally, behavior before and after a change event can be compared by mapping behavior indicia corresponding to the desired time periods.

Behaviors often change over time, and if the change is carefully analyzed, may be used to determine trends. Trends provide even higher dimensional information, and are particularly useful in understanding long term impact of web site modifications. Accordingly, the display can also be configured to present trend information.

Finally, in step 25, the method maps the behavior onto a site display. It is appreciated that such mapping may include displaying indicia representative of entities, relationships and attributes thereof and any desired combination of such indicia may be displayed to illustrate a particular behavior. In a preferred embodiment, the arranged objects are icons representing individual web pages, with arrows indicating enabled page links. Behavior, which is a particular type of high-dimensional information, is then mapped directly onto the representation of the web pages. In a particular example, the icons representing individual web pages contain useful information regarding the represented web page. For example, the icon may indicate the relative amount of text on a page. It will be appreciated that other useful information, or several items of information, can be incorporated onto the iconic representation of the web page. Similarly, icons may be created and presented to represent visitor information and to illustrate the behavior and navigation patterns for each visitor. These display techniques are discussed in further detail below with reference to FIGS. 6–13.

Figure 2:
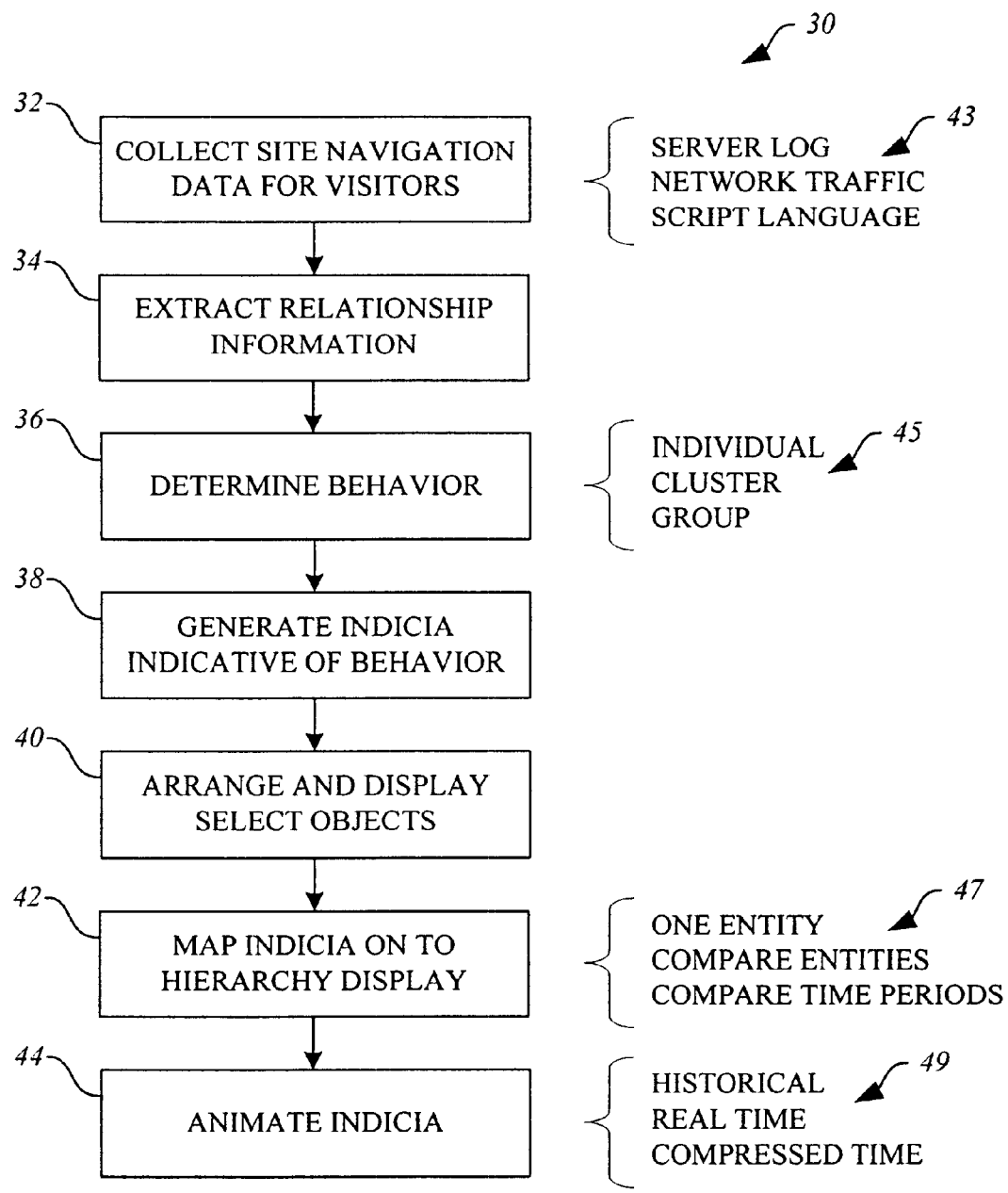
FIG. 2 is another representation of the method of representing high-dimensional information shown in FIG. 1.

Referring now to FIG. 2, a method 30 of collecting, analyzing and displaying high-dimensional information in connection with web site utilization by visitors is illustrated. In step 32, site navigation data for visitors is collected. Three alternatives 43 are identified for collecting site navigation data: 1) extracting data from a server log; 2) extracting data from network traffic; and 3) extracting information from a custom log file generated from embedded script language within each web page. Although three alternatives 43 are identified, it will be appreciated that the site navigation data may be collected in other ways known or to be known in the art. Once the data is collected and stored, most preferably in a relational database, in step 34, relationship information is extracted. In step 36, relationship information is aggregated to determine a behavior. As shown by alternatives 45, behavior can be identified for various targets, including an individual, a cluster, or a group. A cluster is a collection of objects having similar traits. In practice, clusters may identify collections of visitors behaving in a similar way, for example, or may identify a group of visitors according to some static data, such as a demographic characteristic. A group typically refers to a collection of objects sharing a common previously known and well-defined trait(s). For example, "males" would be a definable group.

Next, in step 38, an indicia indicative of behavior is generated. As explained above, such an indicia can be, for example, any symbol, shape, color, or other graphic characteristic, which is capable of identifying or distinguishing one object from another. For example, a green triangle may be used as indicia to indicate which particular web pages prompted a visitor to place an item into his or her "shopping cart." In step 40, objects (e.g., icons representing select web pages) are displayed in a predetermined arrangement and orientation with respect to one another. In step 42, the indicia generated in step 38 is mapped onto the display. For example, the green triangle may be placed on or near each icon representing a web page in which a visitor made a purchase. Alternatively, the indicia of behavior may be, for example, a symbol representing one or more individuals. The indicia may also include arrows (e.g., indicative of traffic flow and/or volume), icons, and graphical elements that may be positioned, sized, or colored to indicate additional high-dimensional information. As shown by alternatives 47, the indicia can be used to describe, for example, the behavior of one or more targets, to compare two or more behaviors, or to compare the behavior of a single target in two or more time periods in either a historical context, in real time or in compressed time formats. In step 44, a computer-generated animation is presented to illustrate the dynamic properties of the behavioral information in either real time, compressed time, or historical time formats. One exemplary embodiment of such a computer animation is described in greater detail below with reference to FIG. 13. As used herein, animating in "real-time" refers to presenting or displaying movement or change that substantially parallels the speed and duration of the actual movement or change that the animation is intended to represent. Such real time animation can be a delayed representation of actual time or an instantaneous representation of actual time. Animation in "compressed time" refers to speeding up the motion of the animation so as to represent an actual time period in a shorter length of time. Animation in "historical time" refers to selecting particular points or periods of time that may be of interest or significant, and only displaying portions of an animation which corresponds to those points or periods of time.

The particular indicia selected to represent a specific behavior is preferably selected in light of the understandings in the field of cognitive science. Cognitive science, which in part attempts to understand how humans perceive information, has identified preferred methods for more effectively presenting higher-ordered concepts. For example, the thickness of an interconnecting line is generally understood by humans to be reflective of the magnitude of a relationship. Table 1 below shows other relationships that generally comport with the understandings of cognitive science. More specifically, the table identifies several indicator indicia, and associates a commonly understood meaning to each indicator. It will be appreciated that other indicators may be used to assign indicia to behaviors.

TABLE 1

| INDICATOR | MEANING |
| --- | --- |
| Closed Graphical Element | Entity |
| Shape Of Graphical Element | Entity Type |
| Color Of Graphical Element | Entity Type |
| Size Of Graphical Element | Magnitude Of The Entity |
| Many Graphical Elements Within Another Element | Conceptual Containment |
| Spatial Ordering Of Graphical Elements | Conceptual Ordering |
| Line Linking Graphical Elements | A Relationship |
| Colored Or Shaped Line | An Attribute Of The Relationship |
| Thickness Of The Line | Magnitude Of A Relationship |
| Tabs Or Sockets On A Graphical Element | Available Relationships |
| Proximity Of Graphical Elements | Group Activity |
| Proximity Of Different Graphical Elements | Relationships Of Groups |
| An Arrow | Asymmetrical Relationship |
| Animation | Sequence of Movements |
| Flicker | Significant Attribute Or Relationship |
| Sound | Significant Activity Occurs |
| Text | Identification |
| Number | Sequencing |
| Intervals | Gaps In Activity |
| Ratio | Comparison |
| Sequence | Order |

Although a static display of high-dimensional information is useful, in an optional preferred embodiment the behavior indicia can be animated to represent a dynamic quality of the high-dimensional information. The animated indicia of block 41 can be animated, for example, as a historical view, a real time view, or a compressed time view. A compressed time view may be particularly informative. For example, the behavior of visitors over an entire day's time period could be animated and viewed in only a few minutes. Such a compressed animation would allow trends and behaviors to be observed that may not be evident in real time or by viewing static charts. It will be appreciated that behavior can be animated in a variety of ways.

Figure 3:
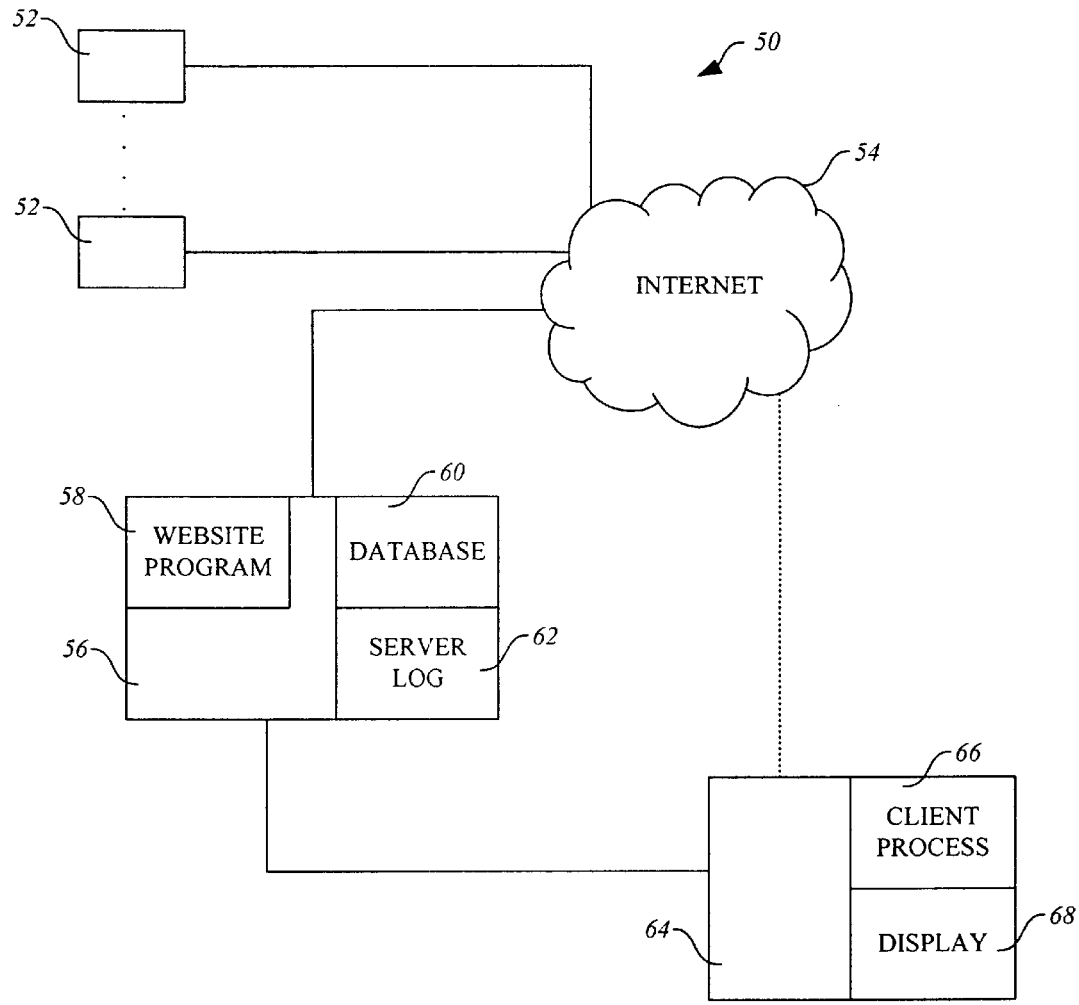
FIG. 3 illustrates the general topology of a system operating a method of representing high-dimensional information in accordance with one embodiment of the present invention.

FIG. 3 illustrates a system architecture 50 for implementing the method for representing high-dimensional information. The system 50 includes users 52 connected to the Internet 54. A server 56, also connected to the Internet 54, executes and operates a web site 58. The server 56 further includes a memory database 60. Typically, the Internet server 56 will automatically generate a server log 62 which tracks data communications to and from the Internet 54. The server 56 further includes a computer device 64 which may be connected to the server, either directly or through the Internet, for executing a client process program 66. The computer device 64 is preferably a personal general purpose computer, but it will be appreciated that other devices may be substituted.

The client process 66 is executed on the computer device 64 and is part of the method of presenting high-dimensional information and cooperates with server side processes for collecting, analyzing and presenting information. For example, information may be presented on a display 68 of the computer device 66. In a preferred embodiment, the client process 66 directs that site navigation information be collected from the server 56 and stored in the memory database 60. With the log 62 and the database 60 stored on the server, the system 50 can be used to analyze and present both real time and historical information.

Figure 4:
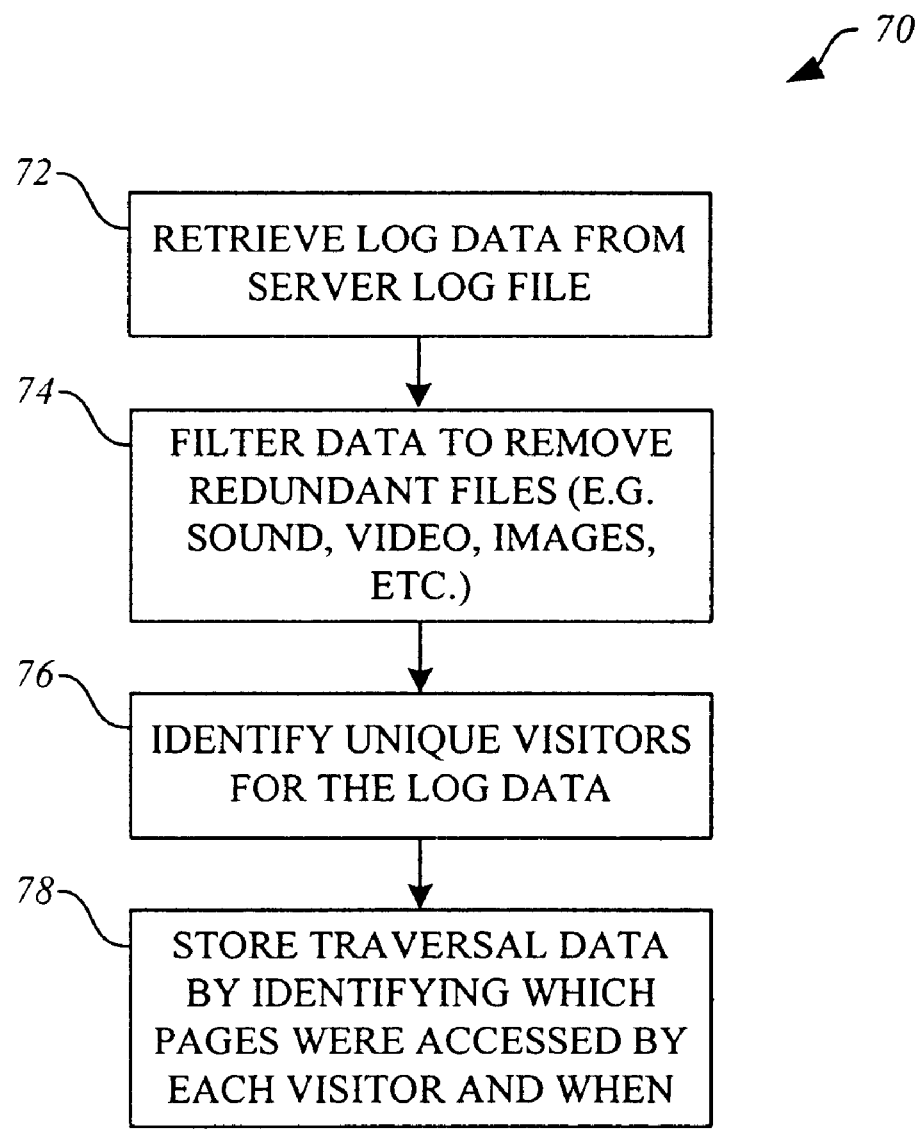
FIG. 4 illustrates alternatives for collecting site navigation data on a web site in accordance with one embodiment of the present invention.

Referring now to FIG. 4, one embodiment of a method 70 of collecting site navigation data is described. In step 72, log data from the web site's server log file is retrieved. Next, in step 74, the retrieved data is filtered to remove redundant files and irrelevant information such as sound files, video files, icon files, etc. In step 76, unique visitors are identified, preferably by his or her IP, domain or URL address, or any combination thereof. Finally, in step 78, web pages accessed by each visitor are identified and this "traversal" data is stored in a database.

As generally described earlier, the method of representing high-dimensional information facilitates collection and presentation of information for a variety of targets. For example, a target can be an entity, a subject of an entity, or a group of entities. The target can also be a group, where a particular identifying feature is found. "Males" and "visitors from MSN.com"are identifiable groups for which behaviors can be determined and presented. Another type of target is the cluster. Clusters are useful for segregating and clarifying the behavior of collections of visitors. Although specific information about visitors may be unknown, clustering provides a convenient and efficient manner for understanding how collections of visitors navigate and use a particular web site.

Figure 5:
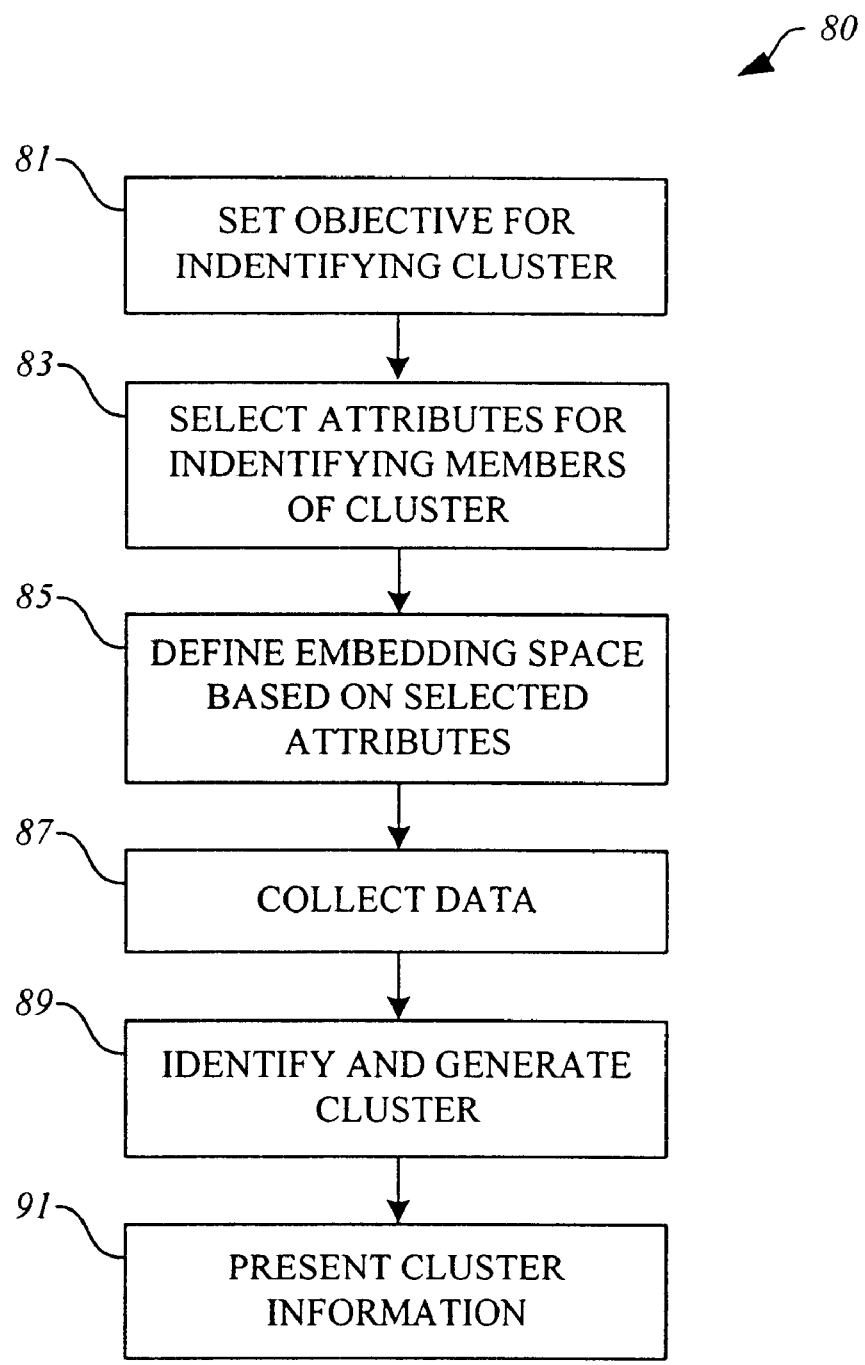
FIG. 5 is a flowchart which generally describes generating a web cluster.

FIG. 5 illustrates one embodiment of a process 80 of defining a web site cluster. In step 81, an objective for the clustering process is set. In step 83, certain attributes are selected for the clustering process. In step 85, the selected attributes are used to define an embedding space for the cluster. An embedding space is defined by selected attributes or characteristics wherein similarities in such attributes or characteristics define a cluster. Although defining embedding space does not necessarily articulate the particular demographics for a group, it does define the general parameters of interest for the cluster. Once the embedding space has been defined, then data can be collected in step 87 and the clusters generated in step 89. Information on the cluster is then presented in step 91. For example, relationships and behaviors can be determined for clusters and then mapped to a displayed representation of web pages to animate how a particular cluster navigates the web site in a particular time period.

Specific examples of how high-dimensional information can be displayed using the methods described above are shown in FIGS. 6–12. Although specific examples and formats are illustrated, it will be appreciated that the format and content may be changed for application-specific purposes. For example, although the illustrated examples show navigation behavior for a web site, the displays could be modified to convey high-dimensional data related to network traffic or common carrier traffic, for example.

Figure 6:
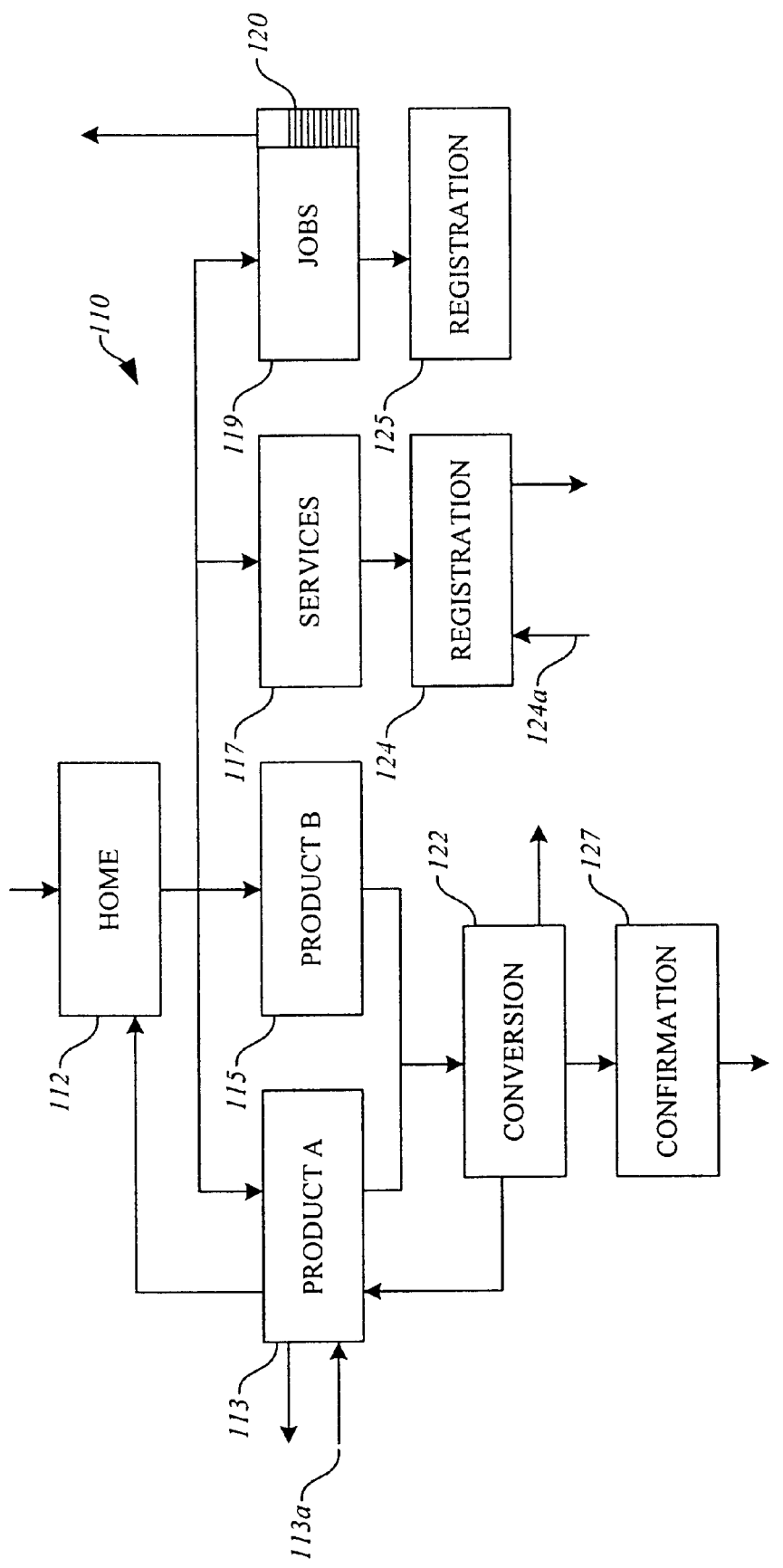
FIG. 6 is an example of a node link diagram representing web pages and links in accordance with one embodiment of the present invention.

Referring now to FIG. 6, one embodiment of a display 110 of web pages 112–127 is shown. In one embodiment, the display 110 is the basic background template on which determined high-dimensional information is mapped. A web site is typically arranged to have a homepage 112 which is then linked to a series of pages, such as page 113, page 115, page 117, page 119, page 124, and page 125. A visitor entering the web site at the homepage 112 could thereby select a hypertext link on the homepage 112 and be transmitted and view the content of the selected page. Visitors may also enter a web site at pages other than the homepage. For example, page 113 shows visitors coming from another link 113a external to the web site. In a similar manner, visitors are coming to page 124 from a link 124a other than the homepage 112. These entry points may be, for example, a previous visitor who has bookmarked a particular page or can be a link from another's web site that avoids the homepage 112.

In the display 110, the represented web pages can be all the web pages of a web site. Accordingly, the display may incorporate a scrolling feature to enable a less cluttered view of selected web pages. To facilitate comfortable viewing, the display 110 may incorporate a zooming feature that enables viewing more or fewer web pages depending on viewer needs. Preferably, the display 110 is configurable to display only selected web pages, such as key web pages in a web site or web pages corresponding to a selected behavioral pattern or cluster. In such a manner, the behavior of visitors may be mapped to only web pages deemed key to successful navigation of the web site. By permitting selective viewing, the display 110 may remain relatively uncluttered but yet convey all critical information. It will be appreciated that the web pages may be manually selected, or may be automatically selected using a definable criteria, such as web pages having the most visits. The iconic representation of the web pages may also include indicia, such as meter 120, which illustrates an attribute of page 119, namely, that page 119 is about 75% filled with text. Accordingly, a person viewing the display can be presented useful information about the web page without adding substantial clutter to the display. It will be appreciated that the informational indication may take many other forms, such as a thumbnail view of the actual web page, for example.

The goal of many web sites is to convert a visitor into a purchasing customer. Accordingly, there is often a page or a set of pages that act as the conversion area 122. The conversion area is where a user makes final good or service selection, authorizes payment for the goods or services, and arranges for delivery. The conversion process may entail a second step where the transaction is confirmed at web page 127. The confirmation page 127 may be, for example, a secure page where the visitor must enter a credit card number before consummating the transaction. At any time during a visitor's navigation of the web site, the visitor may exit the web site. These exit points are identified from arrows pointing away from the web page. The display of web pages can show all enabled links between web pages, or may have only selected links displayed. Also, all web pages can be displayed or a subset of pages may be selected that are considered key to customer conversion.

Figure 7A:
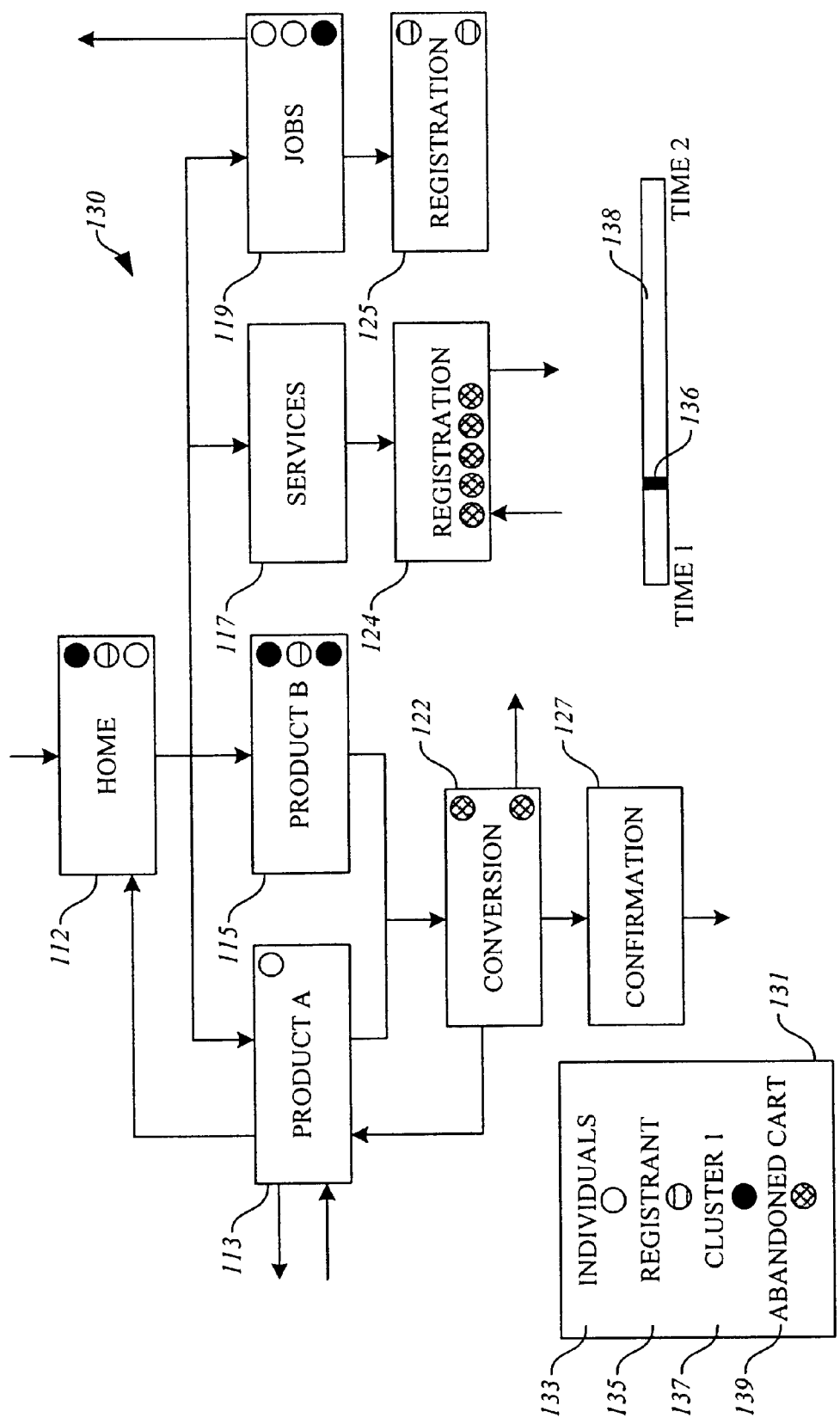
FIGS. 7A and 7B illustrate navigation information being mapped on a the display of web pages in accordance with one embodiment of the present invention.

With the basic web page arrangement displayed for viewing, FIG. 7A illustrates an example of how higher-dimensional behavior information can be presented. Navigational information display 130 shows the same arranged web site pages described above, except symbols 131 are mapped onto the display. Symbols are selected to represent particular targets of interest. For example, a target could be an individual 133, members of a group of registered users 135, members of an identified cluster 137, or even abandoned shopping carts 139. In the illustrated example, each target has a particular graphical symbol or indicia assigned to it. In a particular example, the size of the indicia is proportional to the number of visitors in the target. For example, the relative size of the registered user symbol 135 is in proportion to the number of visitors in that classification. Accordingly, the display not only presents the path behavior of the targets, but can be used to identify which targets have substantial activity.

In a further use of the navigational information display 130, the navigation symbols 131 can be animated to show behavior over time. For example, the symbols may move or change size and/or shape in accordance with real time data, thereby offering an opportunity to conveniently monitor the current behavior of selected targets. Alternatively, the symbols may be animated over a particular historical time period, or have a particular time period presented in a compressed time. For example, an entire week's activity may be compressed and displayed in just a few minutes. In animation it may be desirable that an individual symbol represent, for example, 1,000 users. In such a manner, the display may be easier to interpret, and will show only significant path flow. It will be appreciated that visitor data can be compressed in other ways. In a particular example, a timeline 138 may be presented that has an indicator 136 for showing a time response for the animation. It will be appreciated that the time scale may be alternatively selected and scaled.

Figure 7B:
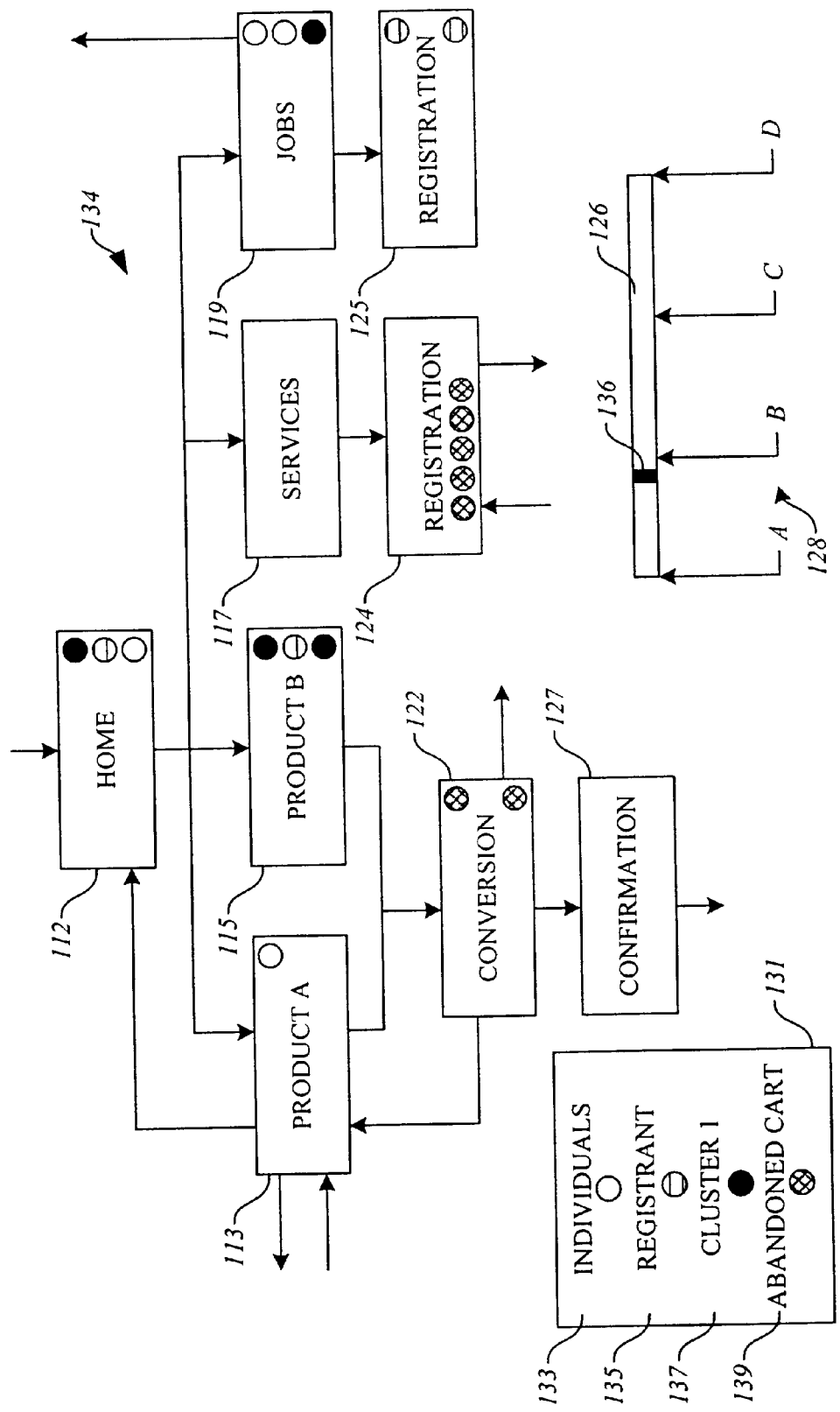

Referring to FIG. 7B, a navigational information display 134 is shown, which is similar to navigational information display 130 described above. As with display 130, display 134 may be animated, except that change event points or time periods are mapped onto the timeline (otherwise known in the art as "journaling") in order to perceive how each change event has impacted the behavior represented by the animation. Accordingly, display 134 has time line 128 with event change markers in the timeline. For example, timeline 126 indicates change events 128 such as change events A, B, C, and D. In one embodiment, each event may indicate a change made to the web site. For example, change event A may indicate the state of the web site when first brought on line, while change event B may relate to a specific improvement to the confirmation page. As the event bar 136 moves between change events, the impact on visitor behavior is readily available. In general use, the events may be sequentially placed, but for a particular application it may be desirable to view impact in a non-sequential way. More specifically, the B event may be positioned on the event line 126 before event C, but event C could precede event B in time.

Figure 8A:
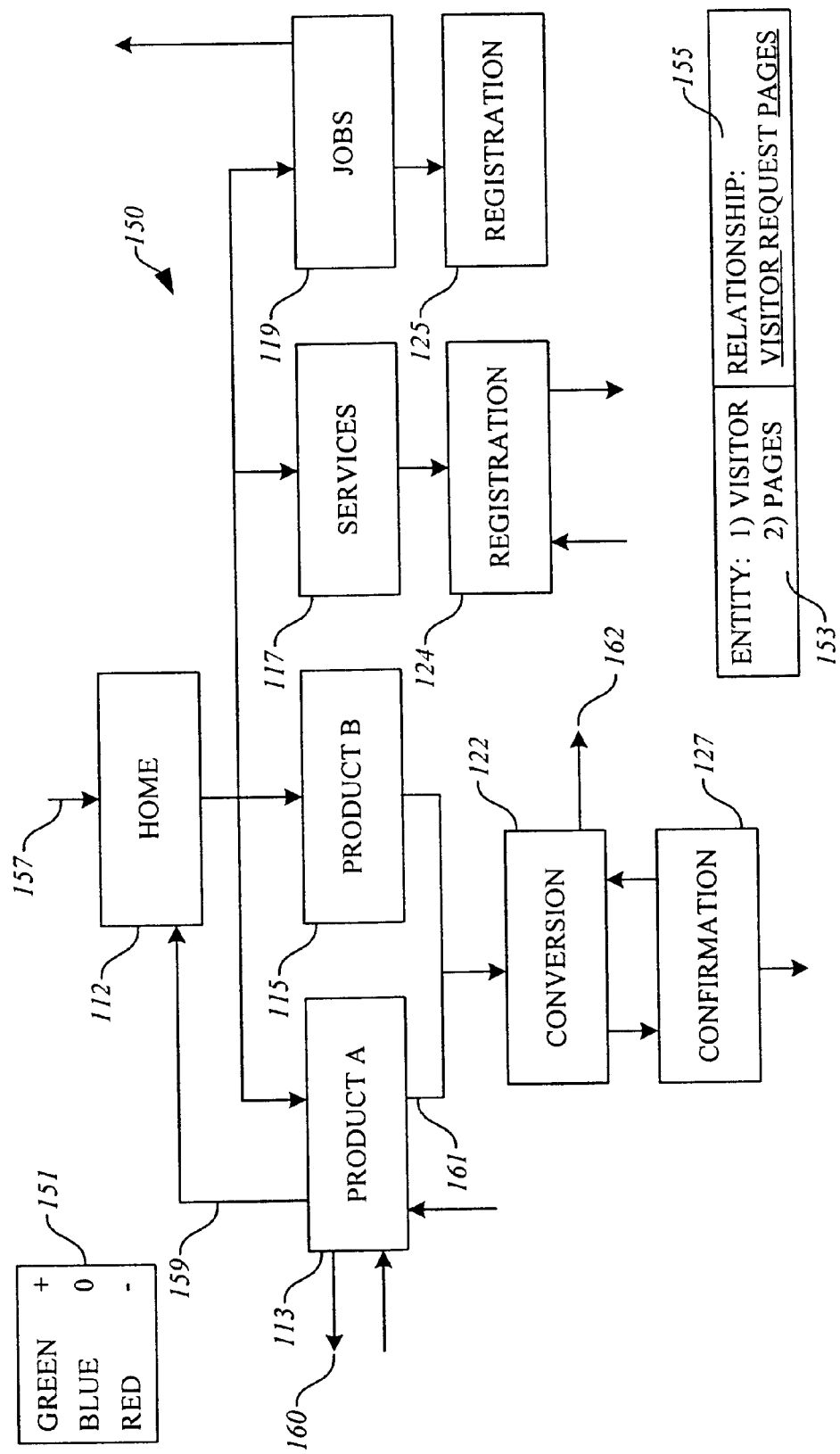
FIGS. 8A and 8B are illustrations of behaviors and trends mapped on the display of web pages and links in accordance with one embodiment of the present invention.

Referring now to FIG. 8A, another display presenting high-dimensional information is illustrated. The behavior display 150 may be used to present various specific behaviors and trends. Advantageously, a similar format can be used to present and analyze a wide variety of behaviors. As described above, a behavior is an aggregate of relationships 155, with relationships being defined between two or more entities. Behavioral display 150 specifically identifies when the entity 153 "visitor" requests the entity "page". To present the behavior, which is the aggregate or summary relationships, an indicia indicative of the behavior is selected. In particular, behavior display 150 selects the arrows between web pages to be the behavior indicia. Thickness of the arrows demonstrate the accumulated statistics for that path. Color is assigned to show a positive, negative, or steady trend in the statistic. Although behavior display 150 chooses the arrow as the behavior indicia, it will be appreciated that other indicia could be selected. For example, the web page graphics could be sized or colored to identify behaviors, or other symbols could be placed on or near each web page. In a preferred embodiment, the indicia possesses a specific color to identify the statistical significance and trend. For example, a green-colored arrow indicates that the behavior is increasing in a statistically significant manner, whereby a red arrow means that the behavior is decreasing in a statistically significant manner. A blue arrow would mean that no statistically significant change has been seen.

In the behavior display 150 shown in FIG. 8A, the path arrows are sized and colored according to the selected behavior. For example, arrow number 157 shows that the majority of users coming into the web site enter through the homepage with arrow 159 showing that page 113 is one of the most popular pages selected from the homepage 112. Importantly, the display illustrates that a large number of visitors exit page 113 as represented by arrow 160, while a significantly fewer number of visitors, represented by arrow 161 go on to conversion page 122. The display 150 further illustrates that a substantial number of visitors traverse from page 115 to a conversion page 122, but unfortunately a large number of visitors exit at arrow 162 before going to the confirmation page 127. Therefore, behavior display 150 identifies two discrete problems that may be addressed by modifications to the web site. First, the conversion page 122 could be modified to encourage a higher percentage of the converted customers to confirm, and page 122 should be modified so that visitors are more readily attracted to other pages, such as the homepage or the confirmation page. As with other presentation displays, the behavior display 150 can be animated so that the size and color of the behavior indicia can be monitored either in real time, compressed time, or historical time.

Figure 8B:
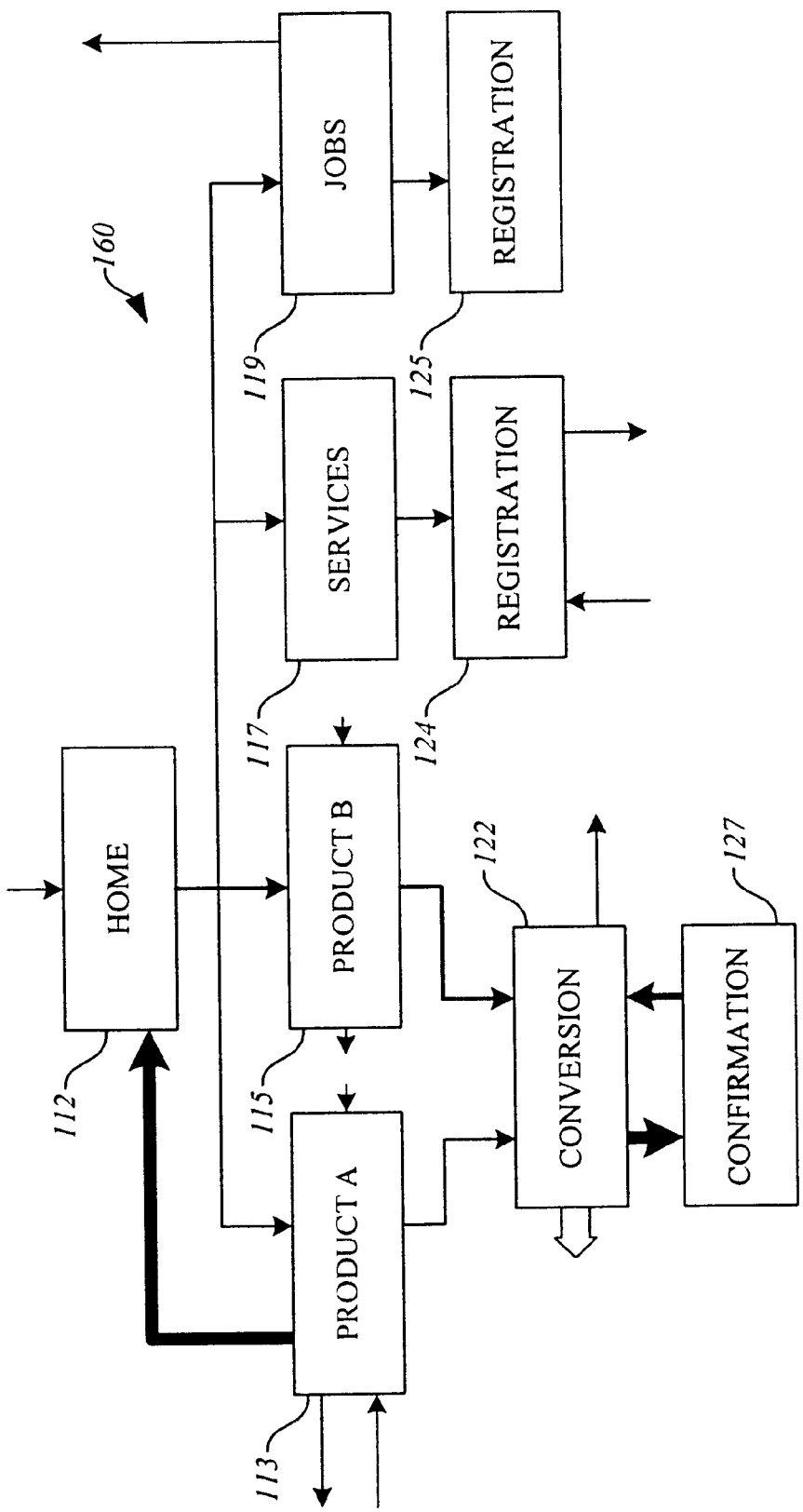

Referring to FIG. 8B, a behavior display 160 similar to behavior display 150 is shown. Behavior display 160 is used to indicate statistically significant differences in behaviors between two or more targets. Alternatively, the display 160 can be configured to show the statistically significant changes between the behavior of one target at different times. In such a manner, the effectiveness of a change can be readily determined, for example. In display 160, the size of the arrow is in proportion to the level of the significance. A large arrow therefore represents a highly significant change, while a small area indicates a low level of significance. The direction of change is indicated by color. In display 160, a black arrow indicates an increasing trend, while the white arrow indicates a decreasing trend.

From the displays described above, the presentation method 10 can be used to describe and present the behavior of individual targets, whether individuals, clusters, or groups. Indeed, the behavior display 160 can be modified to display the behavior of multiple targets simultaneously. For example, a single display can show. the behavior of mates requesting pages and the behavior of females requesting pages. In a similar manner, a single display could be used to show how different age ranges navigate a web site.

Figure 9:
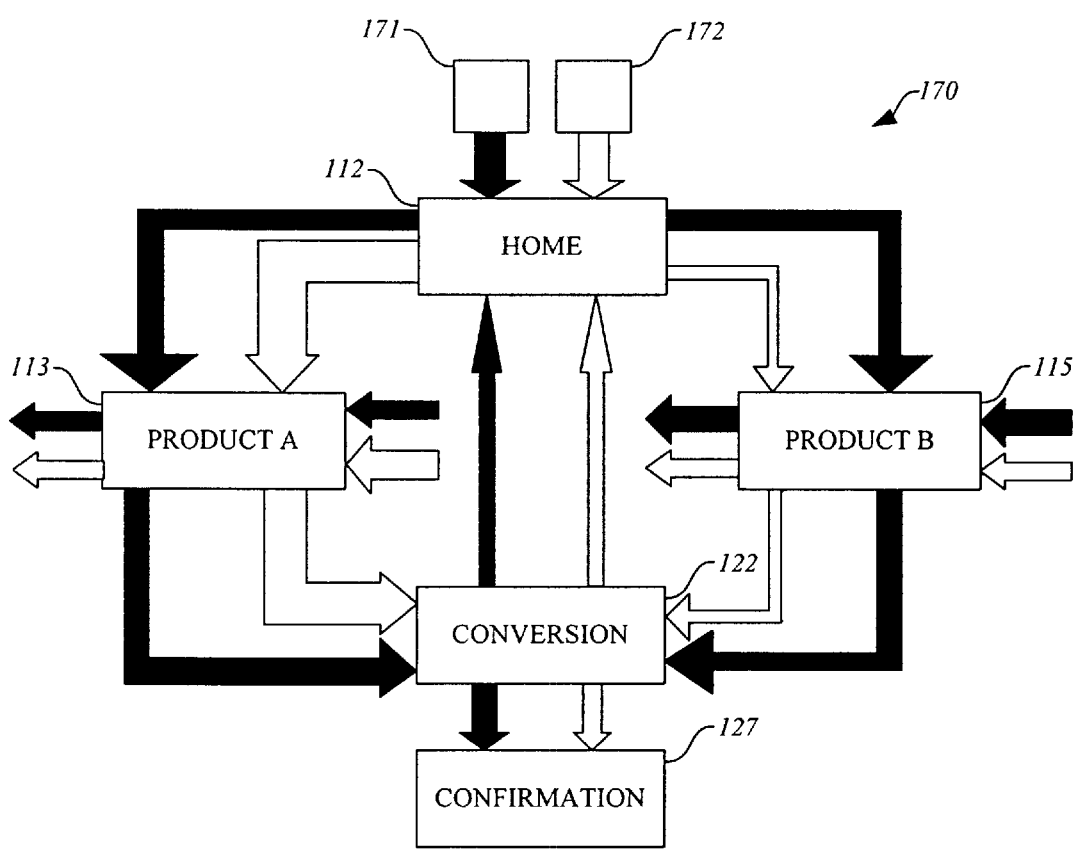
FIG. 9 is an illustration of a behavior mapped on the display of web pages and links in accordance with one embodiment of the present invention.

Another highly useful feature of a preferred embodiment of the method for presenting high-dimensional data is shown in FIG. 9. FIG. 9 illustrates a behavior comparison display 170. Although the behavior comparison display 170 has the consistent web page arrangement as a display template, only selected web pages are represented. The selected pages represent key pages of interest to a business manager, for example. Here, product A page 113, product B page 115, conversion page 122, and confirmation page 127 are considered key for the particular behavior of interest. In comparison display 170, the graphical indicia are indicative of two targets. In FIG. 9, the first target 171 is the group "women", and the second target 172 is the group "men". In particular, solid arrows represent the women, while hollow arrows represent men. The direction, size and color of interconnecting arrows are selected as the indicia of behavior comparison. For example, the thickness of each arrow indicates the accumulation of how many of each target visit each page. As described above, a green arrow could be used to indicate that the males' rate of visiting a particular web page is increasing as compared to a female's rate, and red arrow would indicate that male visitors are requesting a web page at a declining rate as compared to female visitors. A blue arrow would indicate that no statistical conclusion should be drawn. As with other presentation displays, the behavior comparison display 170 can be animated over selected time periods to understand how web activity changes with time. Additionally, for real-time comparisons, it may be desirable to synchronize the animation corresponding to each of two or more entities or groups of entities, such that it appears that all entities have entered the site at the same instant in time. In this way, real-time comparisons of various attributes of behavior between the entities can be compared in a synchronous manner.

Figure 10:
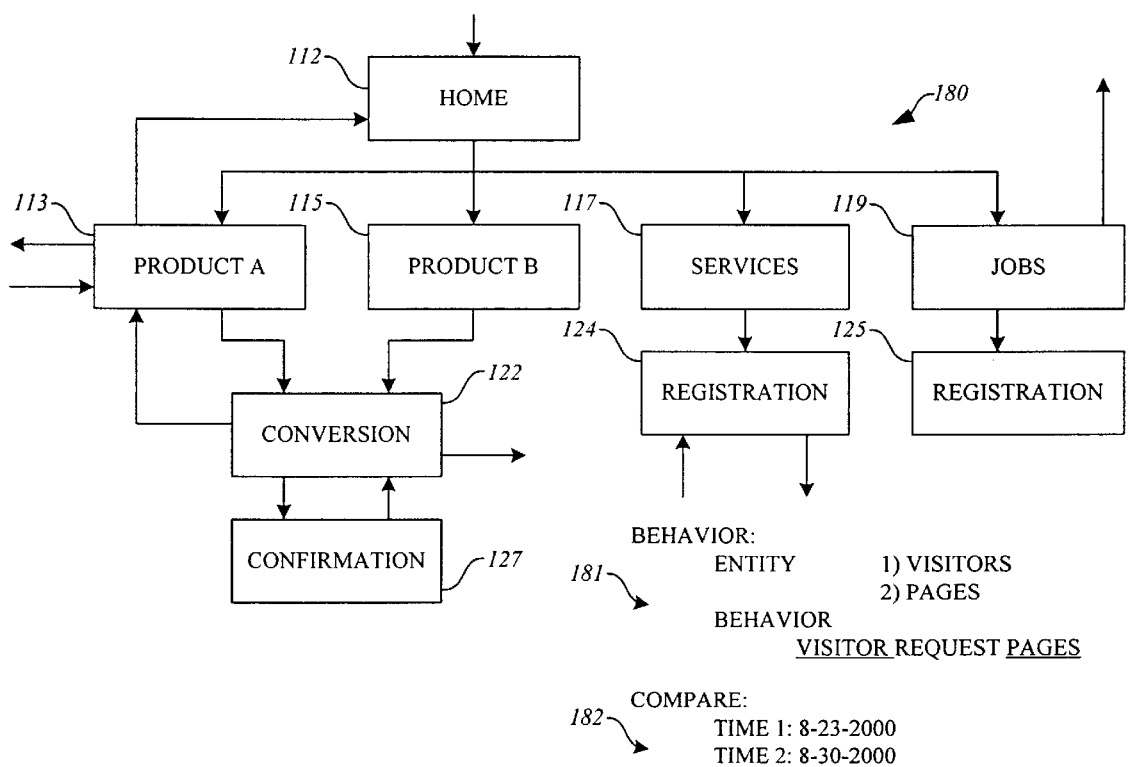
FIG. 10 illustrates behavior mapped on the display of web pages and links in two district time periods so as to compare the behaviors in accordance with one embodiment of the present invention.

The behavior comparison chart 170 is useful for comparing the behavior of two different targets, for example, two groups or two clusters. However, it is often of interest to see how the behavior of a particular target has changed in two distinct time periods. For example, FIG. 10 shows that the behavior of all visitors visiting web pages is compared between selected times 182, namely, time 1 and time 2. In the example, time 1 is described as the 24-hour period of Wednesday, Aug. 23, 2000, while time 2 is defined as Wednesday, Aug. 30, 2000. Such a comparison may be highly useful to understand how a change made in a web site affected visitor behavior. For example, if a change was made to a web site on Aug. 25, 2000, then the time period compression display 180 could be used to identify the differences in behavior of any particular target. Further, not only does the time period comparison display 180 indicate the magnitude of change by the size of interconnecting arrows, but the statistical significance of each change may be identified by color, as described above.

Figure 11:
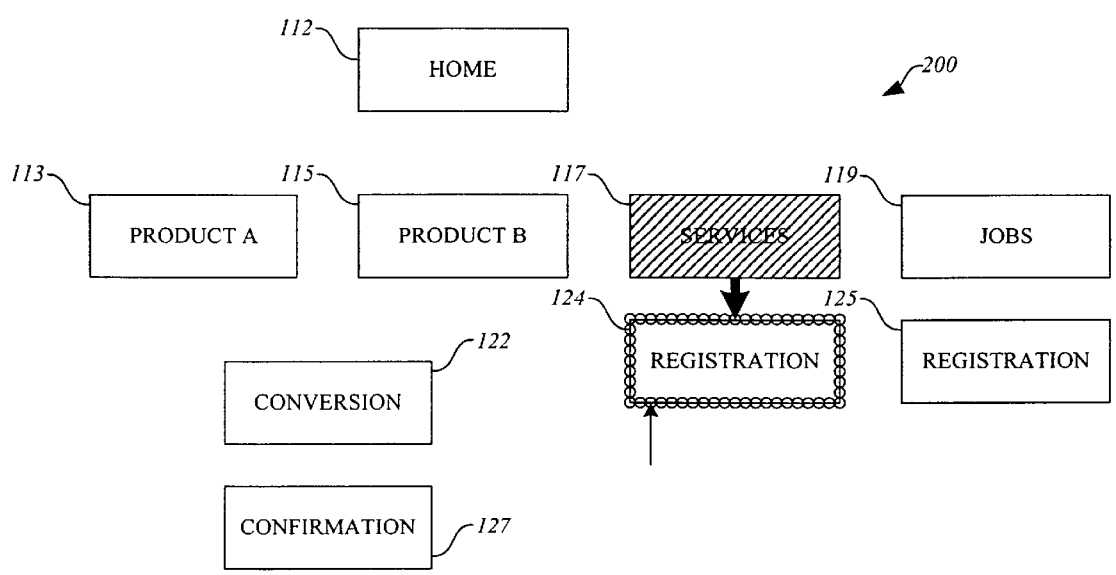
FIG. 11 is an illustration of a first order path analysis mapped on the display of web pages and links in accordance with one embodiment of the present invention.

It can also be particularly useful to understand the path visitors take to a particular web page. Due to the highly flexible nature of hypertext linking, it is particularly difficult to track where visitors to a page originated. An analysis to determine the origin of visitors is often referred to as an event sequence analysis. For example, it would be a first order event sequence analysis to determine and present data pertaining to where each visitor was one hyperlink prior to landing on a specific page. For example, FIG. 11 shows a first order path analysis 200 for the selected web page 124. As shown in FIG. 11, the borders of significant web pages 117 and 124 are highlighted using hash marks. The behavior indicia once again is selected to be the arrows, with the size and the color of the arrow used to indicate magnitude and trend in the behavior. As with the other presentations, the first order path analysis 200 can also be animated over specific time periods.

Figure 12:
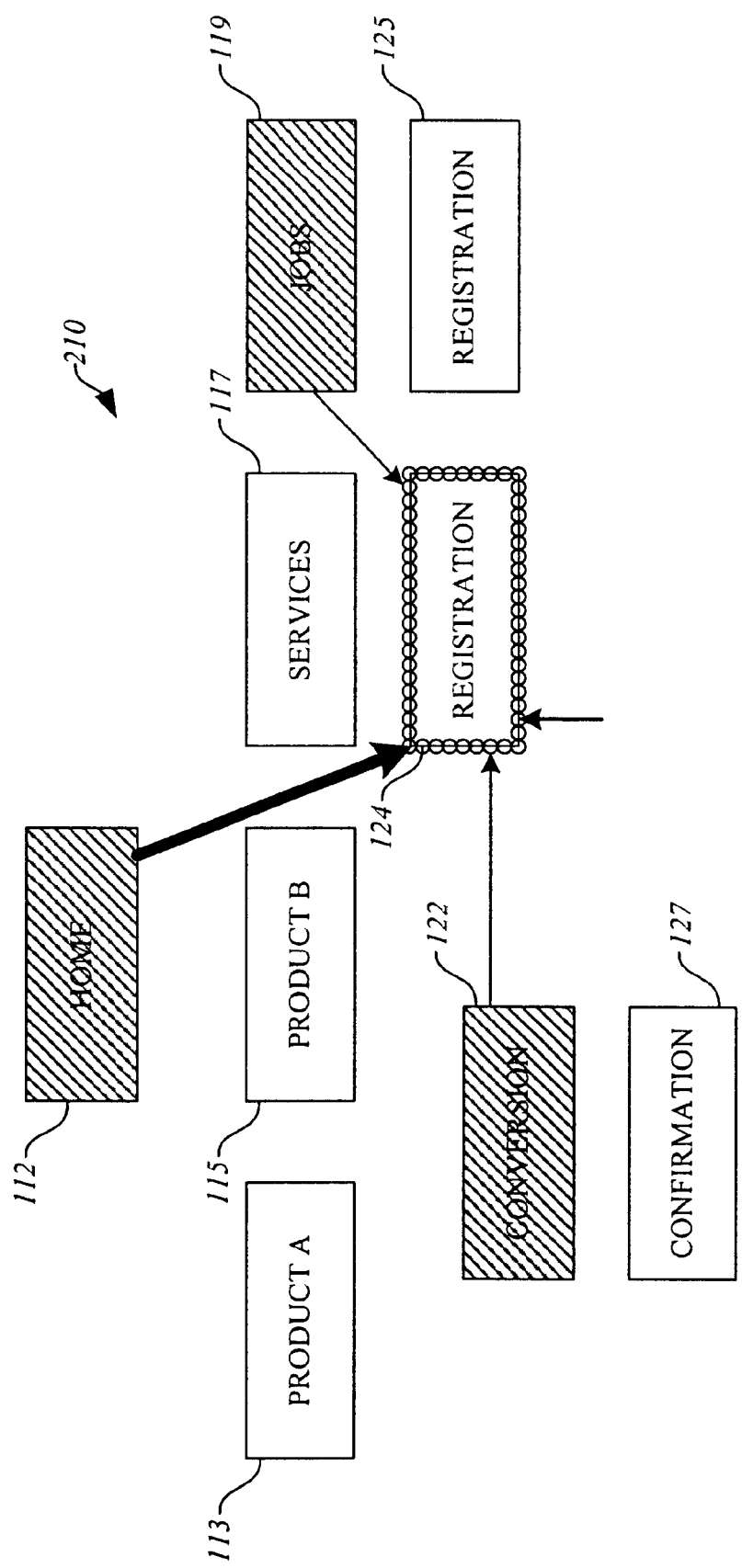
FIG. 12 is an illustration of a second order path analysis mapped on the display of web pages and links in accordance with one embodiment of the present invention.

FIG. 12 indicates a second order path analysis 210 for selected web page 124. This display concisely presents where visitors to page 124 were two hypertext links prior to landing on page 124. As will be appreciated, the magnitude of such an historical path analysis becomes substantially more difficult as the path analysis moves from a first to a second to a higher order analysis. Although path analysis charts 200 and 210 are used to show a first and second order path analysis, it will be appreciated that higher order charts can be constructed in a similar manner. For higher order path analysis charts, it may be desirable to remove selected displayed web page icons and only present statistically significant calling pages. Otherwise, the display may become unusably crowded and cumbersome.

Figure 13:
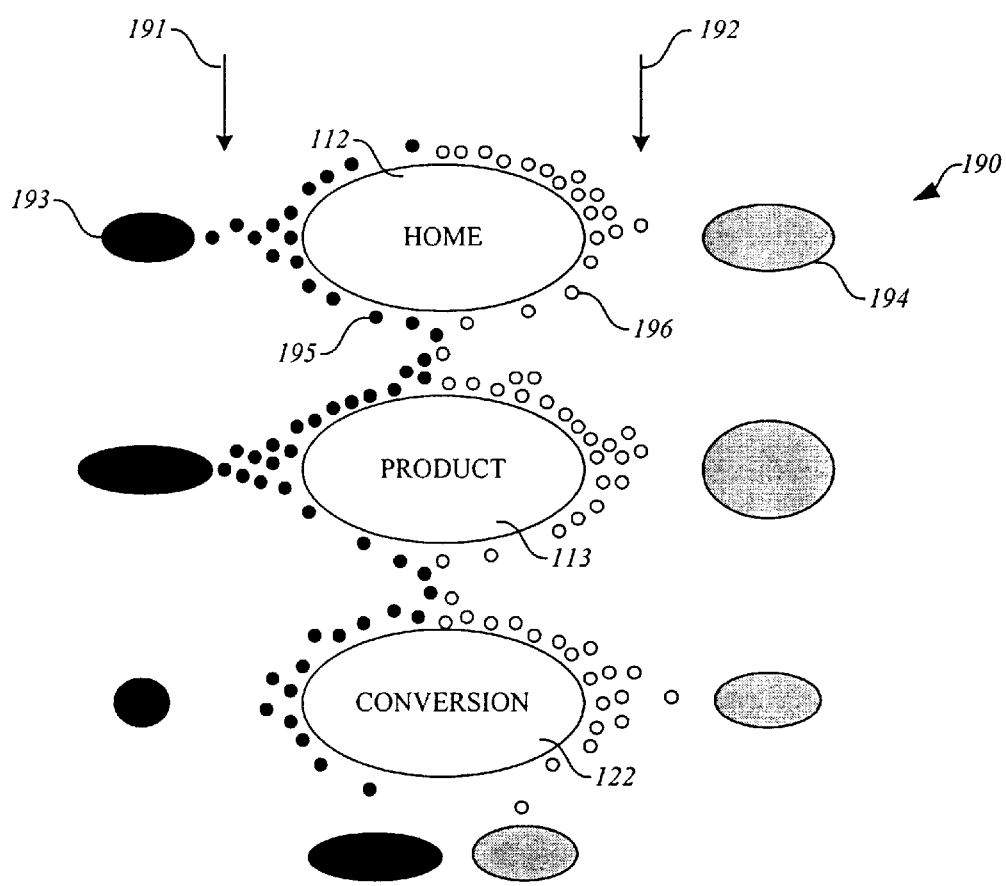
FIG. 13 is an illustration of a presentation and comparison of visitor behavior in accordance with one embodiment of the present invention.

In another example of presenting high-dimensional data, FIG. 13 shows a presentation display 190 of web site activity that allows a business manger to readily perceive several high-dimensional behaviors. In FIG. 13, the presentation 190 shows the behavior of two targets, visitor type 191 and visitor type 192. For example, visitor type 1 could be male visitors while visitor type 2 could be females. It will be appreciated that there is wide flexibility in assigning targets to the presentation 190. In presentation 190, three key pages 112, 113, and 122 are selected to be displayed. As visitors request a page, a small ball such as ball 195 (e.g., representing men) or 196 (e.g., representing women) is associated with that requested page. As the visitor remains on the page, the ball 195 or 196 rotates around the iconic representation of the page to indicate how long the visitor remains on the page. It is appreciated that a ball 195 or 196 may represent any number of visitors from the representative group. For example, each ball 195 may represent 1000 male visitors. Accordingly, a business manager perceives the number of visitors to each page, the length of time visitors are staying on each page, and a comparison of the behaviors of the two illustrated groups.

Further, presentation 190 includes variable exit areas, such as variable areas 193 and 194 for accumulating the exit points for the visitors 191 and 192 and indicating the magnitude of visitors exiting the web site from a particular web page. As visitors exit a page, the variable area associated with that page and that visitor type enlarges to indicate an additional exit from that page. In such a manner, the exit point profile for a web page is readily discernible. For example, if visitor 195 exits page 112, area 193 will increase slightly in size to indicate an additional visitor type 1 exited page 112. Numerical indicators (not shown) may also be associated with each variable area 193 and 194.

Figure 14:
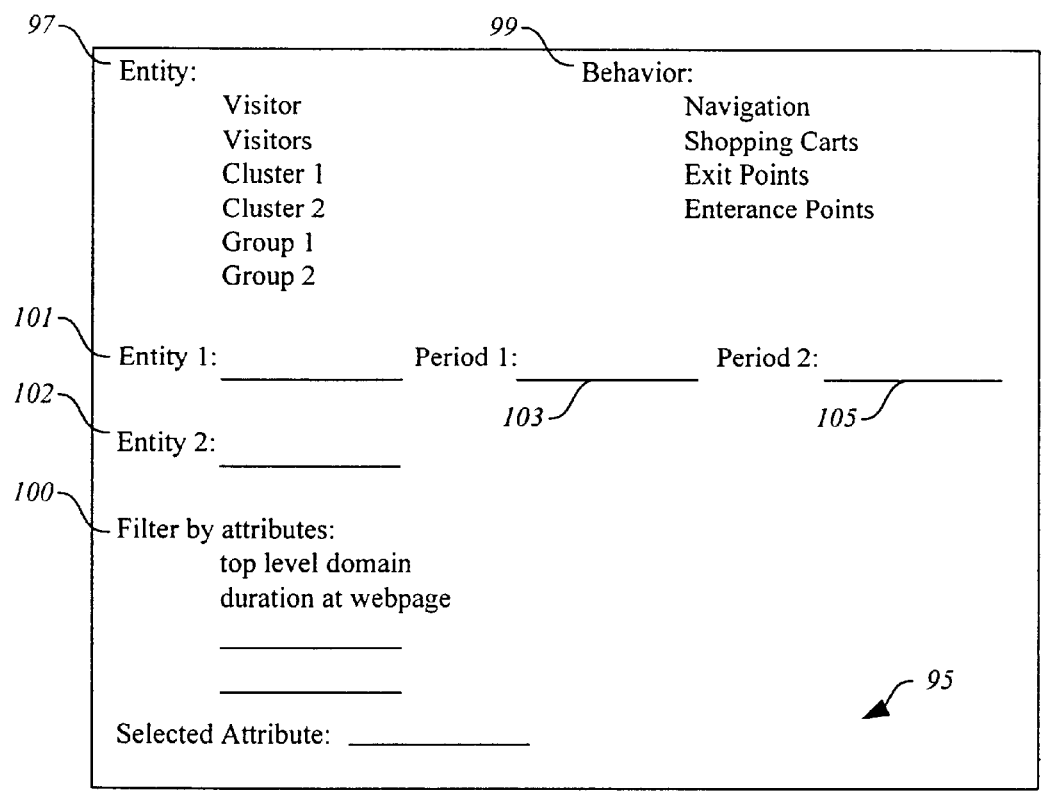
FIG. 14 is an illustration of a display screen for entering criteria for a custom data display in accordance with one embodiment of the present invention.

Although FIGS. 6–13 illustrate specific presentation formats, it will be appreciated that the method for presenting high-dimensional data can accommodate any number of reports, including custom reports. For example, FIG. 14 illustrates a custom analysis input screen 95 where available entities 97 and available behaviors 99 are shown. The input screen 95 can also permit the selection and filtering of entities based on selectable attributes 100. Attributes, such as time duration, could focus the behavior display to illuminate very specific navigational information. A user can then select two entities to compare behavior between entities, or a single entity and two time periods 103, 105 to compare a single entity at two different time periods. Accordingly, the present method of presenting high-dimensional data is extremely flexible and configurable.

Figure 15:
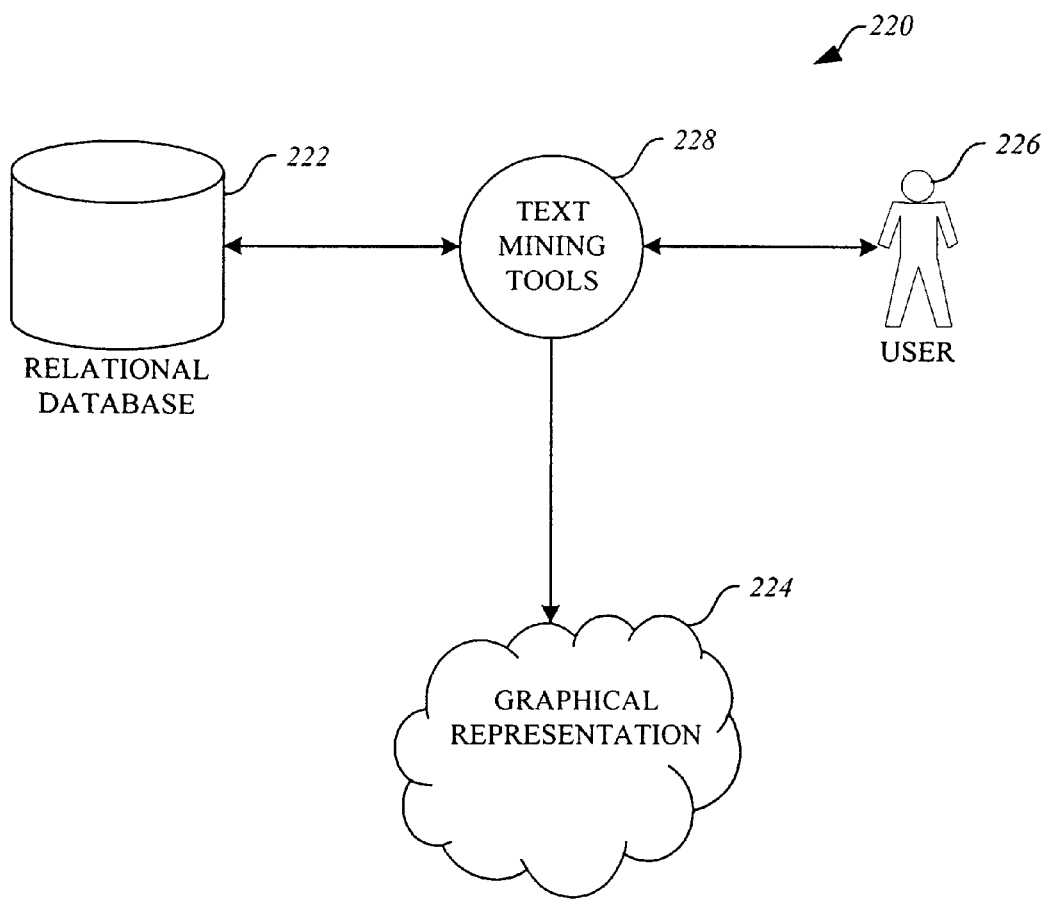
FIG. 15 generally illustrates the generation of an information profile for a target.

In one embodiment of the present invention, an information profile may be determined for a target. The target, as described above, can be an individual user, a group, or a cluster. FIG. 15 illustrates the general procedure for generating an information profile. A user 226 directs selected text-mining tools 228 to act upon the relational database 222. The relational database contains site navigation information and relationship information for selected entities. The text-mining tools 228 are configured to construct context vectors for each of the web pages visited by a particular target. Such text mining tools and associated context vectors are well-known in the art. The individual context vectors can then be summarized to generate an informational profile that generally describes the type of information downloaded by a particular target. That informational profile can then be graphically presented 224 for viewing and analysis.

Figure 16:
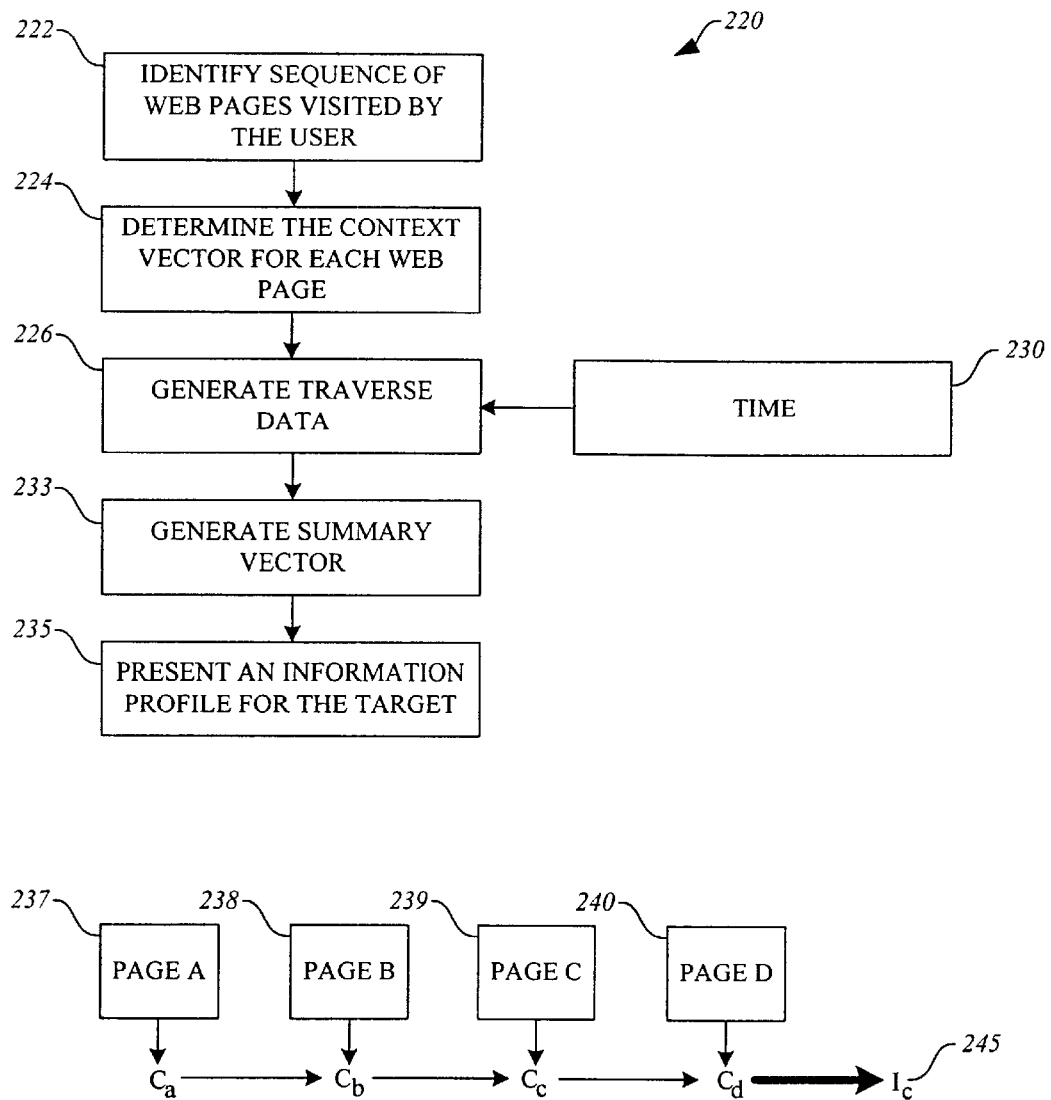
FIG. 16 is a flow diagram generally describing generating an informational profile for a target.

More particularly, FIG. 16 illustrates that the process 220 of creating an information profile includes identifying web pages visited by a user (step 222), determining a context vector for each web page (step 224), generating traverse or navigation data (step 226), as described above, which may include affixing a time stamp to the data (step 230), generating a summary context vector (step 233), which is a summary of the context vectors generated in step 224 above, and finally presenting an information profile for the target (step 235). More particularly, each page such as web pages 237, 238, 239, and 240, which are sequentially visited by a particular target, will have a respective context vector 241, 242, 243 and 244, associated with it. The context vectors 241, 242, 243, and 244 are then summarized into an informational profile context vector 245, also referred to herein as a summary context vector 245. Accordingly, each target may be associated with a summary context vector 245 that generally classifies the areas of interest for a particular target.

In one embodiment, the generation of the summary context vector utilizes the time stamp data to place a weighted value to each individual context vector. For example, the context vector for a recently visited page will be weighted more heavily than the context vector for a page visited further in the past. In a similar manner, context vectors for web pages visited for a long duration will be more heavily weighted than web pages visited for only a brief period. Indeed, it may be advantageous to eliminate the context vectors of pages having too brief a visit, which may indicate the visitor was just surfing through and did not take time to absorb any information. It also may be advantageous to eliminate the context vectors from pages having an excessively long visit, which may indicate the visitor was distracted and just left the browser parked on the web page. It will be appreciated that other methods may be employed to increase the accuracy of the summary context vector. Additionally, it will be appreciated that any other type of weighting function may be implemented. For example, web pages may be assigned an arbitrary weighting function value by a web site operator in accordance with the operator's perceived relative importance of the web pages. Alternatively, the pages may be weighted in accordance with economic criteria (e.g., cost of creating and maintaining each web page), for example. Based on such an economic weighting function, it is contemplated that web site operators may be able to discern cost (risk) versus benefit relationships for various web pages.

Figure 17:
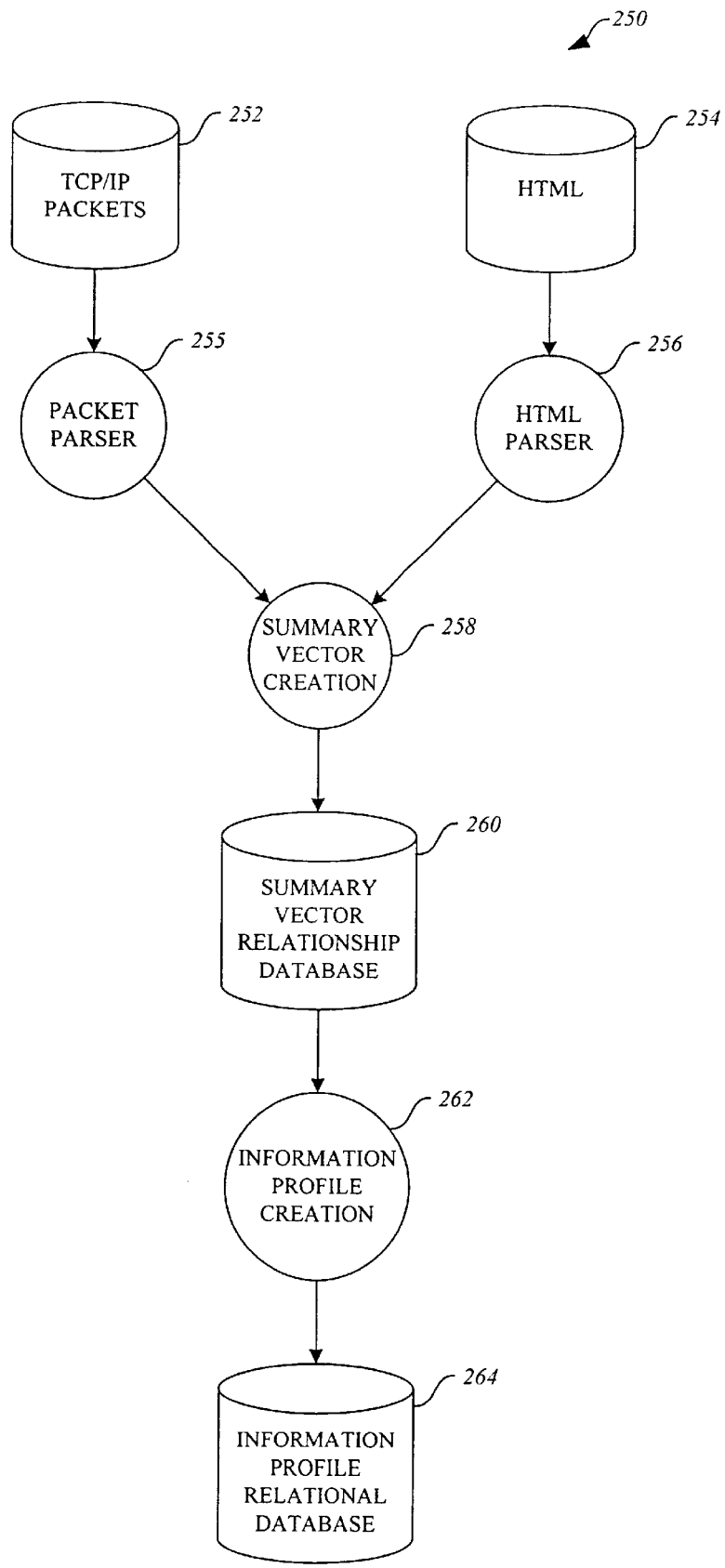
FIG. 17 is an illustration of the process to generate and store informational profile in accordance with one embodiment of the present invention.

As described earlier, certain web sites are constructed with predefined web pages, while other web sites create content for web pages on the fly. FIG. 17 illustrates a method of generating an informational profile 250 to accommodate both types of web sites. For web sites with predefined pages, each web page is typically written in an HTML format 254. As each web page is downloaded, an HTML parser 256 is used to extract information from the HTML web page. However, if the web page is generated dynamically, then the TCP/IP packets 252 may be parsed by packet parser 255 to extract the information. Such packet parsers are well-known in the art and need not be described herein in further detail. Either way, the information arrives at the summary vector creator 258, where known text-mining tools are used to generate context vectors for individual web pages, which are then aggregated to generate a summary vector for a particular target.

The summary vectors are then stored in the relational database 260 along with the navigational information and relationships described earlier. The information profile 262 can then be created and stored in an information profile database 264. The information profile can thereby be used to identify clusters or groups. For example, a group could be identified that is interested in handheld electronic devices. The behavior of this group can then be monitored, analyzed, and presented as described earlier. Based on the observed behavior of this group, the web site could be modified to improve the conversion rate of people seeking handheld electronic devices.

Figure 18:
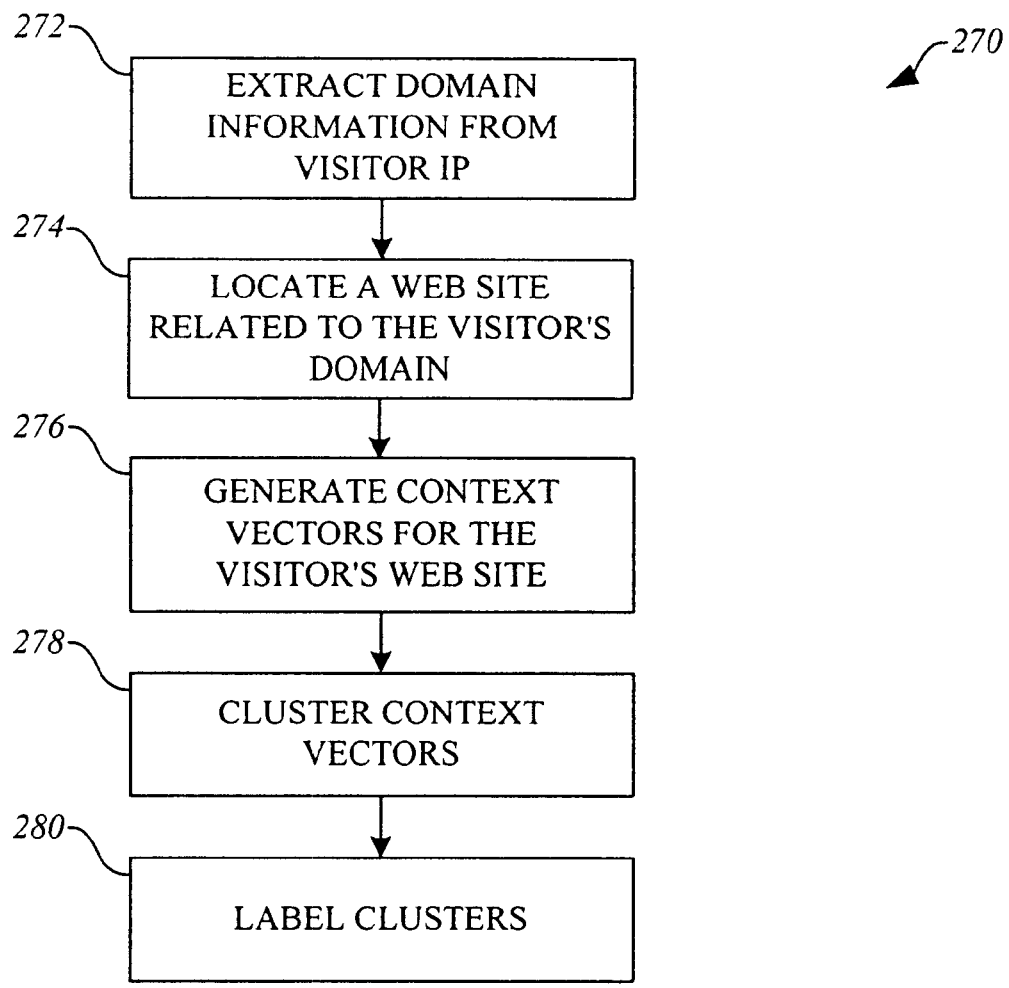
FIG. 18 is a block diagram showing how to generate labels for visitors to a web site in accordance with one embodiment of the present invention.

The method and system illustrated in FIG. 17, analyzes the information a user actually downloads from a web site in an attempt to cluster, group, or classify visitors. FIG. 18 shows an alternative or additional method 270 for identifying or classifying visitors. In step 272, domain information is extracted from a visitor's IP address. Since domain information may include information as to the visitor's source server, the extracted domain information may be useful in understanding the visitor's classification. In step 274, the system attempts to locate a web site that is related to the visitor. For example, if the IP address indicates a visitor originated from a Ford Motor Company server, then the system is enabled to map back to the Ford.com web site. It will be appreciated that alternative techniques can be used to extract source information from the IP address and map to a web site or web page related to the extracted information.

The located web site is then interrogated in step 276 and context vectors are generated for pages from the visitor's web site. Context vectors from many visitors' web sites can then be clustered in step 278 to identify collections of visitors having similar informational content. With the visitors so clustered, in step 280, a label is then assigned to each of the clusters depending on the general informational context vector. In such a manner, it may be possible to identify clusters of users with similar industry relationships. For example, it may be possible to identify that a substantial number of visitors are coming from a particular industry segment. Accordingly, a company could construct web pages specifically focused to that industry segment to increase the appeal of the web site. In another example, it may be possible to identify a cluster as competitors interested in viewing a product, but not in purchasing it. Therefore, the information presented on the page may be adjusted to meet customer requirements but also to minimize information transfer to a competitor.

Figure 19:
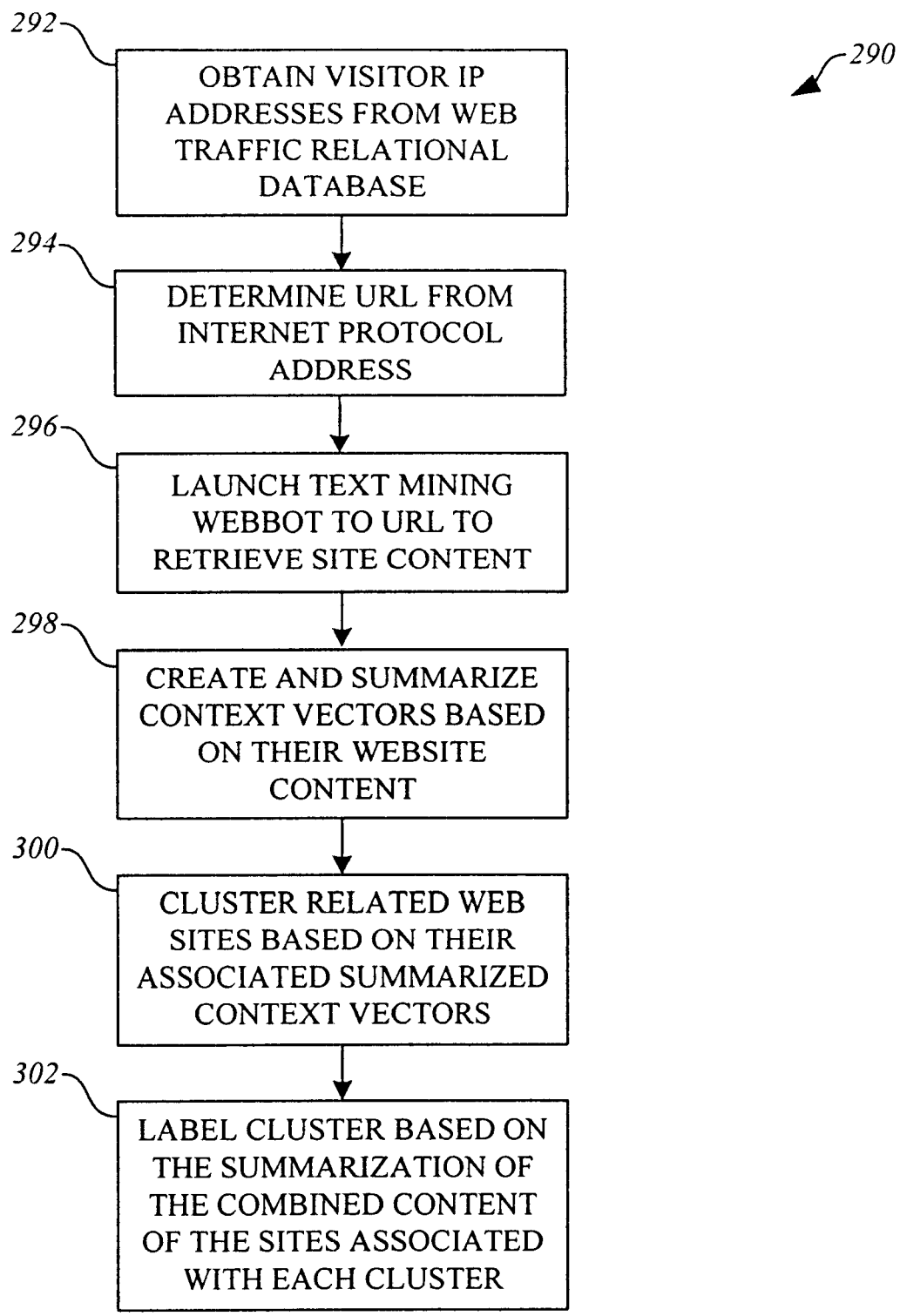
FIG. 19 is a block diagram generally describing the creation of a summary vector for a cluster and assigning of a label to the summary vector for the cluster in accordance with one embodiment of the present invention.

More particularly, FIG. 19 illustrates how context vectors can be used to cluster and label visitors to a web site. As shown in FIG. 19, a method 290, includes a first step 292, in which visitor IP or domain addresses are obtained from a web traffic database, or server log. Such web traffic data is typically captured and stored in a relational database with the IP address or domain address of the visitor recorded. In step 294, the URL address associated with each IP address of each visitor is identified, wherein the URL address may be associated with a particular web site. In step 296, a text-mining web robot or "webbot" is launched to the URL addresses identified in step 294 in order to interrogate or analyze the content of web sites corresponding to the URL addresses. Such "webbots" are well-known in the art. In step 298, context vectors are created and summarized based on web site content and stored in the relational database or other database. After the context vectors have been generated for many visitors, the context vectors are clustered to identify collections of visitors coming from domains having a similar content, in step 300. Next, in step 302, context vectors within each cluster may be summarized and labeled so as to identify each cluster. Data pertaining to the labeled clusters may then be stored in a database. Once visitors have been clustered, as described above, it may be useful to understand an industry association, for example, that can be applied to each cluster. If a large number of visitors are coming from a particular industry segment, it may be advantages to understand what information those visitors are retrieving and develop web pages to more attractively and efficiently present the information. By improving the presentation of useful information, it may be possible to more efficiently meet the desires and expectations of visitors from that industry and direct such visitors to desired web pages such as conversion pages.

It is further appreciated that the webbot may collect information pertaining to other aspects of a web site, or web pages within the web site. For example, information pertaining to the aesthetics of a web site or web page may be "mined" so as to ascertain various aesthetic properties. For example, the color "green" or shades thereof may be assigned a vector value, a vector value may be assigned in accordance with the amount of text present on the web page, or the grey scale of the web page may be assigned a value. In this way, the context vector generated for a web page functions as an "aesthetic vector" that measures various aesthetic properties of a web site or web page. After such aesthetic context vectors are generated, it is then possible to cluster such context vectors so as to identify clusters of web pages as described above—however, based on aesthetics rather than textual content.

The foregoing description of preferred embodiments illustrate just some of the possibilities for practicing the present invention. Many other embodiments are possible within the spirit of the invention. Accordingly, the scope of the invention is not limited to the foregoing descriptions of particular embodiments, which are exemplary only, but instead is commensurate with the scope of the appended claims together with their full range of equivalents.

What is claimed is:

1. In a computer-based system, a method of displaying high-dimensional information pertaining to the interaction between a first set of entities and a second set of entities, comprising:

presenting an arrangement of a first set of graphic objects, wherein each object represents a member of said first set of entities;

identifying a first set of members of said first set of entities;

identifying a second set of members of said second set of entities;

collecting data pertaining to relationships between said first set of entities and said second set of entities;

aggregating said relationship data to define at least one behavioral pattern of said second set of entities with respect to said first set of entities;

creating at least one indicia indicative of the at least one behavioral pattern; and mapping the at least one indicia in proximal relation to the arrangement of said first set of graphic objects so as to illustrate said at least one behavioral pattern of said second set of entities with respect to said first set of entities.

2. The method according to claim 1 wherein the members of said first set of entities comprise web pages and the members of said second set of entities comprise Internet users who access at least one of said web pages.

3. The method according to claim 2 wherein said collecting step comprises retrieving server log information.

4. The method according to claim 2 wherein said collecting step comprises collecting and parsing network traffic information.

5. The method according to claim 2 wherein said collecting step comprises collecting information from said web pages via embedded scripts.

6. The method according to claim 2 wherein said second set of entities comprises a group of said Internet users.

7. The method according to claim 2 wherein said second set of entities comprises a cluster of said Internet users wherein said step of identifying said second set of members of said second set of entities comprises clustering Internet users based on demographic similarities between said Internet users.

8. The method according to claim 2 wherein said second set of entities comprises a cluster of said Internet users wherein said step of identifying said second set of members of said second set of entities comprises clustering Internet users based on behavioral similarities between said Internet users.

9. The method according to claim 1, wherein said at least one indicia comprises an arrow positioned between selected members of said first set of entities so as to represent navigation between the members of said first set of entities by members of said second set of entities.

10. The method according to claim 9 further comprising presenting said arrow at a selected width, the width selected to be generally indicative of the magnitude of navigational movement by members of said second set of entities.

11. The method according to claim 10, further comprising presenting the arrow at a selected color, the color selected to be generally indicative of the mathematical sign of a derivative of said magnitude.

12. The method according to claim 1 further comprising computer animating said at least one indicia so as to illustrate dynamic properties of said behavioral pattern.

13. The method according to claim 12 wherein said at least one animated indicia illustrates said dynamic properties of said behavior pattern so as to substantially approximate real time.

14. The method according to claim 12 wherein said at least one animated indicia illustrates said dynamic properties of said behavior pattern in a compressed time format.

15. The method according to claim 12 wherein said at least one animated indicia illustrates said dynamic properties of said behavior pattern in a historical time format.

16. The method according to claim 12 wherein said animated second set of graphic objects illustrate said dynamic properties of said navigation pattern so as to substantially approximate real time.

17. The method according to claim 12 wherein said animated second set of graphic objects illustrate said dynamic properties of said navigation pattern in a compressed time format.

18. The method according to claim 12 wherein said animated second set of graphic objects illustrate said dynamic properties of said navigation pattern in a historical time format.

19. The method according to claim 1 further comprising:
   presenting an arrangement of a second set of graphic objects, wherein each object represents at least one member of said second set of entities;
   mapping said second set of graphic objects in proximal relation to said first set of graphic objects so as to illustrate a navigation pattern of members of said second set of entities among members of said first set of entities.

20. The method according to claim 19 further comprising animating said second set of graphic objects so as to illustrate dynamic properties of said navigation pattern of members of said second set of entities among members of said first set of entities.

21. The method according to claim 1 wherein:
   said second set of entities comprises a first and second subset of entities;
   said at least one behavioral pattern comprises a first behavioral pattern representative of said first subset of entities and a second behavioral pattern representative of said second subset of entities; and
   said at least one indicia comprises first indicia representative of said first behavioral pattern and second indicia representative of said second behavioral pattern;
   wherein said first and second indicia are mapped in proximal relation to the arrangement of said first set of graphic objects so as to comparatively illustrate said first and second behavioral patterns of said first and second subsets of entities with respect to said first set of entities.

22. The method according to claim 21 further comprising animating said first indicia and said second indicia so as to illustrate dynamic properties of said first behavioral pattern and said second behavioral pattern, respectively.

23. The method according to claim 22 wherein said animated first and second indicia illustrate said dynamic properties of said first and second behavioral patterns so as to substantially approximate real time.

24. The method according to claim 22 wherein said animated first and second indicia illustrate said dynamic properties of said first and second behavioral patterns in a compressed time format.

25. The method according to claim 22 wherein said animated first and second indicia illustrate said dynamic properties of said first and second behavioral patterns in a historical time format.

26. The method according to claim 22 further comprising synchronizing the animation of said first indicia with the animation of said second indicia such that attributes of said first and second behavioral patterns may be compared in a synchronous manner.

27. The method according to claim 1 wherein:
   said second set of entities comprises a first and second subset of entities;
   said at least one behavioral pattern comprises a first behavioral pattern representative of said first subset of entities and a second behavioral pattern representative of said second subset of entities; and
   said at least one indicia comprises a comparison indicia representative of a difference between said first and second behavioral patterns;
   wherein said comparison indicia is mapped in proximal relation to the arrangement of said first set of graphic objects so as to comparatively illustrate said first and second behavioral patterns of said first and second subsets of entities with respect to said first set of entities.

28. The method according to claim 1 wherein:
   said at least one behavioral pattern comprises a first behavioral pattern of said second set of entities during a first time period and a second behavioral pattern of said second set of entities during a second time period; and
   said at least one indicia comprises first indicia representative of said first behavioral pattern and second indicia representative of said second behavioral pattern;
   wherein said first and second indicia are mapped in proximal relation to the arrangement of said first set of graphic objects so as to comparatively illustrate said first and second behavioral patterns of said first and second time periods, respectively, of said second set of entities with respect to said first set of entities.

29. The method according to claim 28 wherein said first and second time periods are separated by an intermediate time period during which an event occurs.

30. The method according to claim 28 wherein said event comprises a change to at least one member of said first set of entities.

31. The method according to claim 28 further comprising animating said first indicia and said second indicia so as to illustrate dynamic properties of said first behavioral pattern and said second behavioral pattern, respectively.

32. The method according to claim 31 further comprising synchronizing the animation of said first indicia with the animation of said second indicia such that attributes of said first and second behavioral patterns may be compared in a synchronous manner.

33. The method according to claim 1 wherein the size of said at least one indicia illustrates a relative magnitude of a property of said at least one behavioral pattern.

34. The method according to claim 1 wherein the color of said at least one indicia illustrates a differential property of said at least one behavioral pattern.

35. The method according to claim 1 wherein said first set of members of said first set of entities comprise web pages and said second set of members of said second set of entities comprise Internet users, wherein at least one web page is presented because at least one Internet user originated from said at least one web page prior to traversing to another one of said web pages, thereby providing an indication of the origin of Internet users visiting a particular web page.

36. In a computer network environment, a method of clustering visitors to a web site, comprising:
   identifying web pages within said web site visited by said visitors;
   generating context vectors for said web pages;
   summarizing the generated context vectors to generate a summary context vector for said visitors;
   storing said summary context vectors in a database;
   identifying visitors with similar summary context vectors;
   clustering said identified visitors with similar summary context vectors;
   labeling said cluster of visitors; and
   storing information pertaining to each labeled cluster in said database.

37. The method according to claim 36 further comprising the act of time-stamping said context vectors, and wherein said summarizing step comprises weighting said context vectors according to the duration said visitor stayed at each of said web pages.

38. The method according to claim 36 wherein said step of generating context vectors comprises assigning an arbitrarily selected weighting function value for each of said web pages.

39. The method according to claim 36 wherein said step of generating context vectors comprises assigning a weighting function value for each of said web pages based on economic criteria.

40. The method according to claim 36 wherein said generating step includes text mining said web pages.

41. The method according to claim 36 wherein said generating step comprises using an HTML parser to extract information from said web pages.

42. The method according to claim 41 wherein said generating step comprises text mining said second web sites.

43. The method according to claim 36 wherein said generating step comprises using a packet parser to extract information from said web pages.

44. The method according to claim 36 wherein said step of identifying web pages comprises extracting information from network traffic data stored in a database.

45. The method according to claim 36 wherein said generating step comprises collecting aesthetic information pertaining to each of said web pages and wherein said context vectors are indicative of aesthetic properties of said web pages.

46. In a computer network environment, a method of identifying clusters of visitors to a first web site, comprising:

extracting domain information from said visitors;

identifying at least one second web site associated with said visitors based on said extracted domain information;

generating context vectors for each of said at least one second web sites, wherein said context vectors are representative of the content in said second web sites;

clustering said generated context vectors so as identify clusters of visitors associated with said at least one second web site having similar content;

labeling said cluster of visitors; and storing information pertaining to each labeled cluster in a database.

47. The method according to claim 45, wherein said step of extracting domain information comprises identifying a URL for at least one of said visitors and said step of generating context vectors comprises downloading selected web pages from a web site associated with said URL and text mining said downloaded web pages.

* * * * *

UNITED STATES PATENT AND TRADEMARK OFFICE
CERTIFICATE OF CORRECTION

PATENT NO.   : 6,661,431 B1
DATED        : December 9, 2003
INVENTOR(S)  : Vincent Stuart et al.

It is certified that error appears in the above-identified patent and that said Letters Patent is hereby corrected as shown below:

<u>Title page,</u>
Item [73], Assignee, "Stone Analytica, Inc." should read
-- Stone Analytics, Inc. --

Signed and Sealed this

Fourth Day of May, 2004

JON W. DUDAS
*Acting Director of the United States Patent and Trademark Office*